US011687667B2

(12) United States Patent
Horne et al.

(10) Patent No.: US 11,687,667 B2
(45) Date of Patent: Jun. 27, 2023

(54) PRIVACY-PRESERVING COMPUTING WITH THIRD-PARTY SERVICE

(71) Applicant: Amazon Technologies, Inc., Seattle, WA (US)

(72) Inventors: William Horne, Lawrenceville, NJ (US); Eric Crockett, Redmond, WA (US)

(73) Assignee: Amazon Technologies, inc., Seattle, WA (US)

( * ) Notice: Subject to any disclaimer, the term of this patent is extended or adjusted under 35 U.S.C. 154(b) by 33 days.

(21) Appl. No.: 17/396,124

(22) Filed: Aug. 6, 2021

(65) Prior Publication Data

US 2023/0053566 A1    Feb. 23, 2023

(51) Int. Cl.
| G06F 21/00 | (2013.01) |
| G06F 21/62 | (2013.01) |
| H04L 9/32  | (2006.01) |
| H04L 9/00  | (2022.01) |

(52) U.S. Cl.
CPC .......... *G06F 21/6227* (2013.01); *H04L 9/008* (2013.01); *H04L 9/3242* (2013.01)

(58) Field of Classification Search
None
See application file for complete search history.

(56) References Cited

U.S. PATENT DOCUMENTS 10,333,696 B2 * 6/2019 Ahmed ................. H04L 9/3268

FOREIGN PATENT DOCUMENTS

| CN | 109716345 A | * | 5/2019  | ........... G06F 21/602 |
| CN | 110622165 A | * | 12/2019 | ........... G06F 21/602 |
| EP | 2547033 A2  |   | 1/2013  |                        |
| EP | 3075093 A1  |   | 10/2016 |                        |

OTHER PUBLICATIONS

E. Crockett, "A Low-Depth Homomorphic Circuit for Logistic Regression Model Training," In Proceedings of ACM Conference (Conference'17)., https://doi.org/10.1145/ 12 pages, Jul. 17, 2017.
PCT, "International Search Report and Written Opinion" Application No. PCT/US2022/039503, dated Nov. 18, 2022, 17 pages.

(Continued)

*Primary Examiner* — Andrew J Steinle
(74) *Attorney, Agent, or Firm* — Eversheds Sutherland (US) LLP

(57) ABSTRACT

Systems, devices, and methods are provided for secure multiparty computation (MPC) protocols. A first computing entity may send a first cryptographically protected data set to a server and a second computing entity may send a second cryptographically protected data set to the server. The server may lack access to plaintext versions of the data sets. The server may compare cryptographically protected data elements from the first and second data sets as part of a secure MPC protocol to determine certain information regarding the data sets, such as determining which data elements are included in both sets, and perform homomorphic computations according to a homomorphic encryption scheme. The server is accordingly able to determine an encrypted result.

21 Claims, 9 Drawing Sheets

(56) References Cited

OTHER PUBLICATIONS

D. Karapiperis et al., "An LSH-Based Blocking Approach with a Homomorphic Matching Technique for Privacy-Preserving Record Linkage," in IEEE Transactions on Knowledge and Data Engineering, Apr. 2015, vol. 27, No. 4, pp. 909-921 ;doi: 10.1109/TKDE.2014.2349916.

H. Chen et al., "Fast Private Set Intersection from Homomorphic Encryption" CCS '17: Proceedings of the 2017 ACM SIGSAC Conference on Computer and Communications Security, Oct. 2017, pp. 1243-1255; https://doi.org/10.1145/3133956.3134061.

* cited by examiner

PRIVACY-PRESERVING COMPUTING WITH THIRD-PARTY SERVICE

BACKGROUND

The sharing of sensitive and/or private data may be desirable but challenging due to various security and/or privacy considerations. A first organization may have access to a first sensitive and/or private data set and a second organization may have access to a second sensitive and/or private data set such that there are data privacy, business sensitivity, or regulatory constraints around the sharing of such data with the other party. There may be various scenarios in which the sharing of such data is desirable for data analytics or collaboration, but may be challenging due to the sensitive/private nature of the data.

Existing techniques for sharing sensitive and/or private data sets between parties have various shortcomings. So-called "data clean rooms" that attempt to preserve data privacy may actually expose sensitive and/or private data to a third-party platform in plaintext, thereby expanding the attack surface by which an adversary may gain access to such data. Other techniques that have been attempted may suffer from poor computational performance. Accordingly, techniques for securely sharing data between multiple parties may be improved upon.

Figure 1:
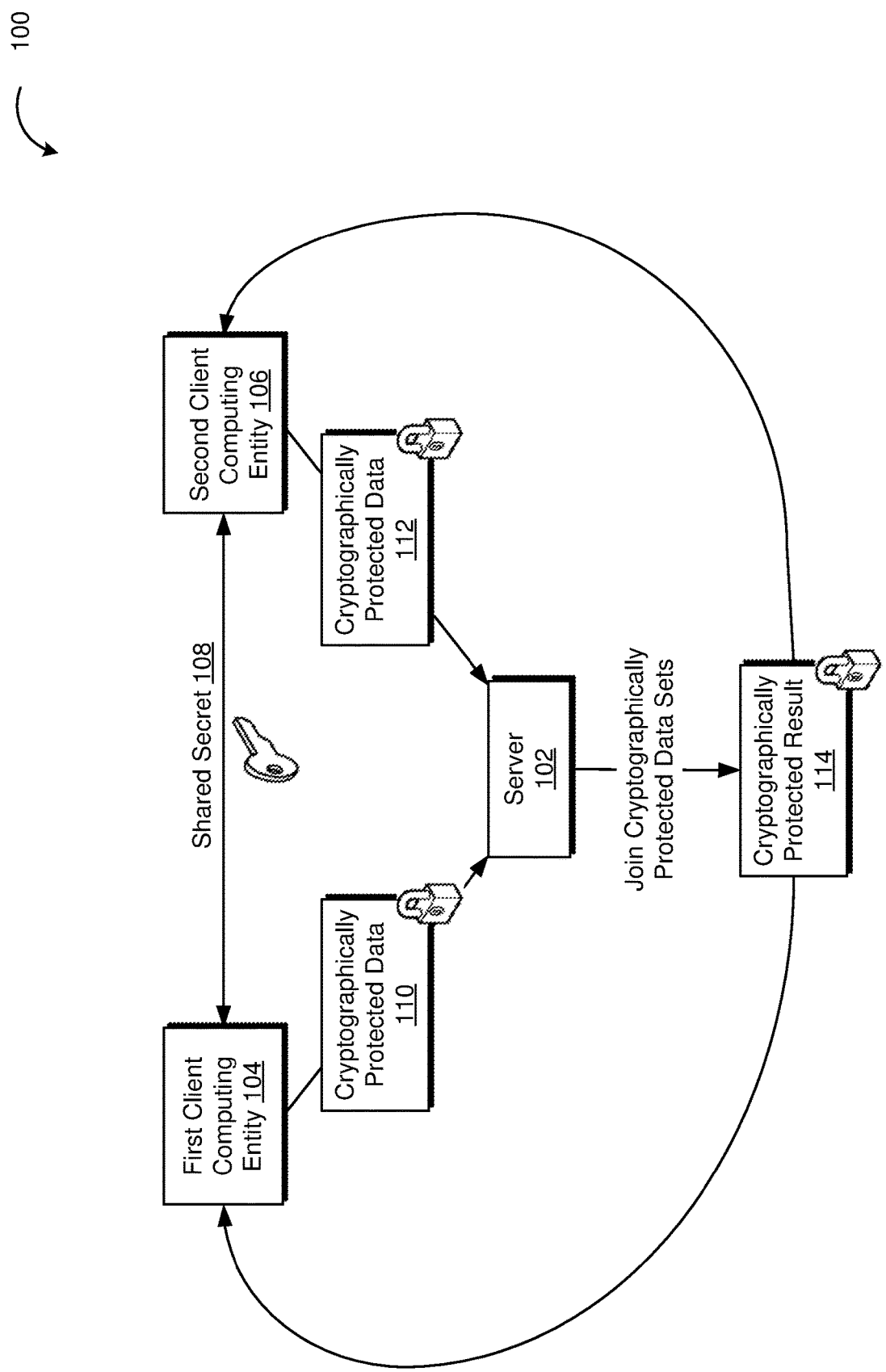
FIG. 1 illustrates a computing environment in which server-aided privacy-preserving computing may be performed, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for secure multiparty computation (MPC) protocols with third-party intermediary. The third-party intermediary may be implemented as a service provided by a computing resource service provider for two or more clients. A secure MPC protocol as described in greater detail below may be utilized by two or more computing entities (e.g., clients) to share sensitive and/or private data to a third-party service in a manner that simultaneously maintains the confidentiality of the data and allows the third-party service to perform various computations (e.g., data analytics) without requiring plaintext versions of the data to be available to the service.

Secure MPC protocols with third-party service may be utilized in various scenarios where there are barriers to information sharing. For many use cases, two or more parties may have access to data in which there are barriers to performing joint analytics. These barriers may be due the privacy of the data, sensitivity of the data, regulatory constraints on the data, and so on. For example, in a healthcare context, a secure MPC protocol with third-party service may be used by a research institution to aggregate patient statistics from a hospital network's patient data on a third-party service. The statistics may be aggregated such that the hospital networks' patient data is never revealed to the third-party service or research institution in plaintext, and the aggregate statistics do not reveal individual patients' private health information and are in compliance with all applicable regulatory, legal, and privacy rules. Cryptographically protected versions of the parties' data may be provided to the third-party service such that the data from both parties (e.g., clinical data from both the research institution and the hospital network) are kept confidential from the counterparty and the third-party service. As another example, a directed content provider may use a platform to serve directed content as part of a campaign to users and utilize a secure MPC protocol to perform analytics on the results to determine the results of the directed content campaign. For example, the efficacy may be measured based on subsequent user action, such as increased engagement or spending. In at least one embodiment, a secure MPC protocol with third-party service may be used by a directed content provider and platform to perform analytics to determine aggregate statistics of the efficacy of the directed content campaign without revealing information regarding individual users' behavior.

Different types of cryptographic techniques may be utilized for different portions of a data set to allow for various types of privacy-preserving computations. For example, a column of data that is used to determine set membership may be cryptographically protected using a keyed one-way function such as a Hash-based Message Authentication Code (HMAC) algorithm using a key that is shared between two or more clients and kept secret from a server that receives hashed data sets from two or more clients. In such a protocol, the server may be able to determine when a data element is in both data sets based on two hash outputs matching, but the server will be unable to determine the underlying content that is common to the data sets.

For example, the efficacy of a drug may be determined based on records from a clinical research facility and one or more hospital networks. The clinical research facility may cryptographically protect a column of patient identifiers using an HMAC algorithm. Hospital networks may cryptographically protect their medical records by HMAC'ing a column of their patients. These cryptographically protected data sets may be transmitted to a server that performs privacy-preserving computations to determine the rate of hospitalization for patients undergoing the clinical trial and compare it to the rate of hospitalization to a broader population. In this way, information about which individuals are participating in the clinical trial is not divulged to hospital networks and the server providing the privacy-preserving compute functionality, and hospital networks satisfy their obligations under HIPAA to not divulge medical record information regarding who was admitted to the hospital.

Homomorphic encryption (HE) may be utilized in connection with various techniques described below. Homomorphic encryption may refer to a type of encryption in which certain types of computations may be performed on the encrypted data without requiring access to the corresponding plaintext. Homomorphic encryption may be used to perform privacy-preserving computations on encrypted data.

For example, an asymmetric-key variant of a homomorphic encryption scheme may provide for the following encryption APIs for a security parameter n, wherein the encryption of a plaintext m is denoted by $\boxed{m}$.

$$k_{eval}, k_{sk}, k_{pk} \leftarrow HE.\text{Keygen}(n)$$

$$\boxed{m} \leftarrow HE.\text{Encrypt}(k_{pk}; m)$$

$$m \leftarrow HE.\text{Decrytpt}(k_{sk}; \boxed{m})$$

$k_{sk}$ refers to the private key of an asymmetric key pair used for decryption, $k_{pk}$ refers to the public key of the asymmetric key pair used for encryption, and $k_{eval}$ refers to an evaluation key that is an abstraction of different public keys used to perform homomorphic computation, including relinearization keys and Galois keys.

Homomorphic encryption schemes may support privacy-preserving computing on encrypted data. For example, in at least one embodiment, homomorphic addition denoted by the "⊕" operator and homomorphic multiplication denoted by the "⊙" operator may be supported by the HE scheme such that:

$$\boxed{a} \oplus \boxed{b} = \boxed{a+b}$$

$$\boxed{a} \odot \boxed{b} = \boxed{a \cdot b}$$

Various arithmetic circuits may be implemented according to a homomorphic encryption scheme to implement arbitrary functions, including those to perform privacy-preserving computations for data collaboration, and more. Homomorphic encryption (HE) schemes described herein may be leveled HE schemes, and may refer to partially homomorphic encryption schemes. An example of a partial homomorphic encryption scheme is a Paillier cryptosystem. In various embodiments, a Paillier cryptosystem allows for homomorphic addition of ciphertexts. In various embodiments, a partial encryption scheme such as Paillier or ElGamal encryption system implements homomorphic addition but not homomorphic multiplication. In some cases, a partial encryption scheme implements homomorphic multiplication but not homomorphic addition.

Clients may generate cryptographically protected data sets and provide the cryptographically protected data—and not the plaintext data—to a server. Cryptographic protection techniques may refer to privacy-preserving techniques are utilized to ensure the confidentiality of data provided to a third-party service, including but not limited to the use of keyed one-way functions, order preserving encryption, homomorphic encryption, and combinations thereof.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a computing environment 100 in which server-aided privacy-preserving computing may be performed, in accordance with one or more example embodiments of the present disclosure. FIG. 1 depicts a server 102 that provides privacy-preserving computing to clients such as first client computing entity 104 and second client computing entity 106. In various embodiments, the parties depicted in FIG. 1 participate in a secure multiparty computing (MPC) protocol where a client's data set is never revealed in plaintext to other parties, and the contents of the client's data set are not determinable by other parties. Server 102 may perform privacy-preserving computations on the cryptographically protected data according to the secure MPC protocol to generate a result. In some embodiments, the result generated by server 102 is a cryptographically protected result (e.g., homomorphic sum). In some embodiments, the result generated by the server 102 is not cryptographically protected from server 102—for example, the result for a secure MPC protocol may be to compute the cardinality of the intersection of two sets, in which case server 102 may be made aware of the total number or upper bound of matching set elements. However, server 102 will not be able to determine information regarding the underlying contents of the matching elements.

Server 102 may refer to one or more computer systems, such as those described in connection with FIG. 9. Server 102 may be implemented in the context of a computing resource service provider and may one or more processors and memory that, as a result of execution, causes the one or more processors to receive and/or process requests from clients such as first client computing entity 104 and/or second client computing entity 106. Server 102 may receive requests, commands, messages, etc. from clients in the form of a web service application programming interface (API) request. Server 102 may include executable code to communicate with other computing resources, such as scalable compute services, which may be used to expedite the execution of secure multiparty computations. In some embodiments, server 102 is an honest-but-curious (HBC) computing entity that follows a secure MPC protocol but may attempt or may be assumed to learn as much as possible from information that server 102 receives. Furthermore, it may be assumed that server 102 does not collude with other computing entities in a manner that is inconsistent with the prescribed secure MPC protocol. Server 102 may be implemented in the context of a computing resource service provider and have access to a large amount of compute resources that can be used to facilitate faster execution of operations than would otherwise be available to clients.

First client computing entity 104 may refer to any suitable computing entity including machines and computer systems such as those described in connection with FIG. 9, as well as embedded devices and Internet-of-Things (IoT) devices. Second client computing entity 106 may likewise be implemented in a similar manner.

In some embodiments, first client computing entity 104 and second computing entity 106 collect or otherwise have access to private or sensitive data. In some cases, first computing entity 104 and second computing entity 106 are controlled by different organizations and the sensitive data owned by the respective organizations are not to be shared with the other party. Server 102 may be used to facilitate privacy-preserving computation using data from both computing entities in a manner that maintains the confidentiality of the data.

First client computing entity 104 and second computing entity 106 may establish a shared secret 108. Shared secret 108 may refer to a cryptographic secret, such as a symmetric key, that is shared between first client computing entity 104 and second client computing entity 106. Various techniques may be utilized to establish shared secret 108, such as those based on Diffie-Hellman key exchange, TLS handshake process, and more. Techniques for establishing shared secret 108 may be discussed in greater detail below, for example, as described below in connection with FIGS. 2-8. Shared secret 108 may be used to coordinate the manner in which data is cryptographically protected by first client computing entity 104 and second client computing entity 106. For example, data columns that are to be used for private set intersection may be cryptographically protected by HMAC'ing the data elements using the shared key 108.

FIG. 1 illustrates an example environment in which federated learning may be implemented using techniques described in greater detail below. For example, multiple computing entities may provide data sets that are cryptographically protected (e.g., using encryption or other cryptographic techniques) to a third-party service that securely performs joint computations on the cryptographically protected data sets while providing for varying assurances of privacy-preservation. Endpoints may be implemented as first client computing entity 104 and/or second computing entity 106. For example, data collected from sensors and Internet-of-Things (IoT) devices owned by a third party may be cryptographically protected to preserve the privacy of their customers.

Techniques described herein may be used by two or more organizations to utilize a third-party to perform joint computations on cryptographically protected versions of sensitive data. In at least one embodiment, first client computing entity 104 has access to a first set of sensitive and/or private data set and second computing entity 106 has access to a second set of sensitive and/or private data set. The parties may agree upon a secure MPC protocol to perform a particular set of computations—for example, the parties may agree upon a secure MPC protocol to identify elements that are common to both data sets and that those elements (and not others) are to be made available to one or both parties. As a second example, a secure MPC protocol may be agreed upon so that the data sets are to be joined and then a sum or product computed only on the joined subset or a portion thereof.

Cryptographically protected data such as cryptographically protected data 110 and/or cryptographically protected data 112 may be generated in any suitable manner, for example, by using a HMAC to generate tags that are one-way or effectively one-way based on a key that is shared between first client computing entity 104 and second client computing entity 106. Data may be cryptographically based on how it is to be used as part of a secure MPC protocol. For example, data that is to be used to perform a set membership test may be cryptographically protected through the use of an HMAC function or other suitable keyed one-way functions. As a second example, data that is to be manipulated through addition and/or multiplication may be encrypted according to a homomorphic encryption scheme. As yet another example, data that is to be compared relative to other data may be encrypted according to an order-preserving encryption scheme. Cryptographically protected data 110 may provide cryptographically verifiable assurances of confidentiality that prevent second client computing entity 106 and server 102 from inferring the underlying contents.

Server 102 may perform privacy-preserving computations using cryptographically protected data 110 and cryptographically protected data 112. Server 102 may lack sufficient cryptographic material to determine the underlying contents of either and/or both protected data sets. In some embodiments, server 102 performs a join on cryptographically protected data sets to determine a joined cryptographically protected data set that comprises a subset of rows that satisfy a set membership test that is performed against HMAC'd quantities. The server 102 lacks sufficient cryptographic material to infer the underlying contents of the matching elements, according to at least one embodiment. One or more computations may be performed based on a join of two or more cryptographically protected data sets or data tables, according to at least one embodiment. For example, a homomorphic sum may be computed by joining two or more cryptographically protected data tables together and then homomorphically adding together the cryptographically protected elements of a column of the joined table that is encrypted according to a homomorphic encryption scheme. A cryptographically protected result 114 may be generated as a result of one or more computations performed on cryptographically protected data 110 and cryptographically protected data 112. Cryptographically protected result 114 may encode any suitable information that is agreed upon by parties of a secure MPC protocol. For example, cryptographically protected result 114 may encode a homomorphic sum as discussed above; cardinality of a joined table; the joined table itself (in a cryptographically protected format); and more.

Other examples may include secure MPC protocols using a third-party to facilitate analytics on data that is subject to government regulations such as Health Insurance Portability and Accountability (HIPAA) that control the sharing of personally identifiable information (PII) and personal health information (PHI). Techniques described herein may be used to confidentially share data that may be useful for drug discovery, medical imaging, developing and understanding diseases, and more accurately predicting healthcare outcomes without exposing patients' PHI or PII data to other parties. Encrypted versions of PHI and/or PII data may be shared with a third-party service in a manner that maintains the confidentiality of the PHI and/or PII data such that the third-party service is unable to infer what the underlying PHI and/or PII data is. In this way, patient data is not placed at risk.

Figure 2:
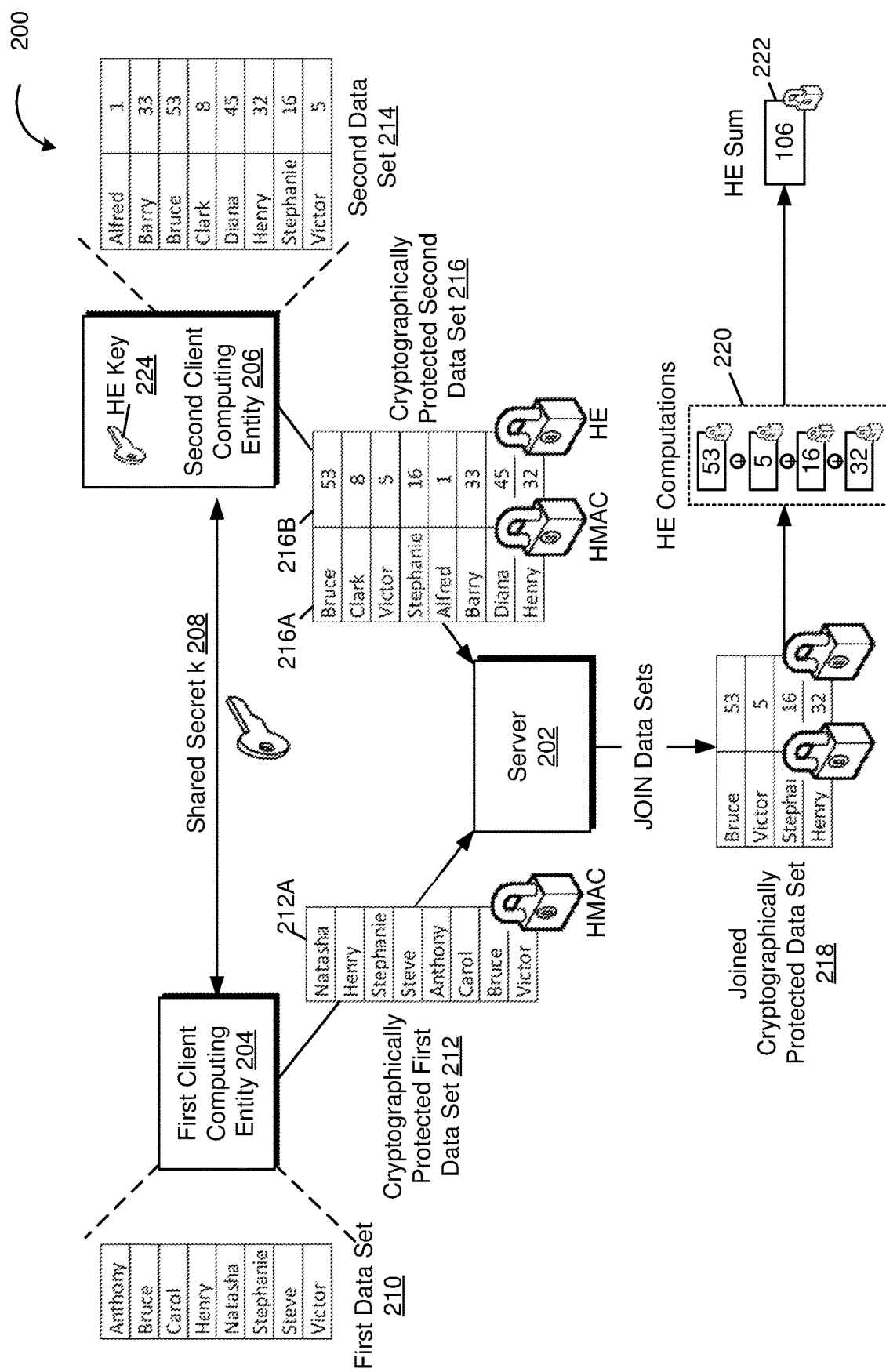
FIG. 2 illustrates a computing environment in which server-aided private set intersection computations may be performed, in accordance with one or more example embodiments of the present disclosure.

FIG. 2 illustrates a computing environment 200 in which server-aided private set intersection computations may be performed, in accordance with one or more example embodiments of the present disclosure. In at least one embodiment, computing environment 200 comprises a server 202, first client computing entity 204, and second client computing entity 206 that are connected to each other via a communications network. Server 202, first client computing entity 204, and second client computing entity 206 may participate in a secure multiparty computation (MPC) protocol in which a server 202 facilitates the execution of computation based on cryptographically protected versions of data provided by first client computing entity 204 and second client computing entity 206. Server 202 is unable to determine the contents of the underlying data, and the participating clients do not infer any information about the underlying data set of the counterparty's data beyond what is specified in the protocol. Accordingly, techniques described herein improve data security of computer systems by which clients securely share cryptographically protected versions of data sets with a server to perform joint computations on the data sets. The data provided by the clients are cryptographically protected such that the server is unable to determine their contents, the quantities computed by the server are cryptographically protected (e.g., encrypted) so that the server is unable to determine the contents of any intermediary computations or end result of the computations. In contrast, previous techniques have required clients to provide a third party with plaintext versions of their data, resulting in greater risk that sensitive data is inadvertently or maliciously divulged to unintended parties.

Server 202 may refer to one or more computer systems, such as those described in connection with FIG. 9. Server 202 may be implemented in the context of a computing resource service provider and may one or more processors and memory that, as a result of execution, causes the one or more processors to receive and/or process requests from clients such as first client computing entity 204 and/or second client computing entity 206. Server 202 may receive requests, commands, messages, etc. from clients in the form of a web service application programming interface (API) request. Server 202 may include executable code to communicate with other computing resources, such as scalable compute services, which may be used to expedite the execution of secure multiparty computations. In some embodiments, server 202 is tasked with conceptually performing a join (e.g., inner join) of the names in first data set and second data set summing the integer values of the matching rows, while preserving the confidentiality of the contents of the first data set and second data set. Server 202 may be considered an honest-but-curious (HBC) computing entity that follows a secure MPC protocol but may attempt or may be assumed to learn as much as possible from information that server 202 receives. Furthermore, it may be assumed that server 202 does not collude with other computing entities in a manner that is inconsistent with the prescribed secure MPC protocol.

First client computing entity 204 may refer to one or more computer systems and may be implemented as a hardware system (e.g., machine), such as those described in connection with FIG. 9. In various embodiments, first client computing entity comprises one or more processors and memory storing executable instructions that, as a result of execution, cause the one or more processors to implement various functionality described herein. For example, first client computing entity 204 may include instructions to communicate with server 202. First client computing entity 204 and server 202 may communicate with each other over a computer network and establish a client-server relationship. However, formally establishing a client-server relationship is not necessarily required in all embodiments. First client computing entity 204 may have access to a first data set, which may be used as part of a multiparty computation in conjunction with a second data set that is inaccessible to first client computing entity 204 and kept secret from first client computing entity 204, as part of secure multiparty computation protocols described herein.

Second client computing entity 206 may refer to one or more computer systems and may be implemented as a hardware system (e.g., machine), such as those described in connection with FIG. 9. In various embodiments, second client computing entity 206 comprises one or more processors and memory storing executable instructions that, as a result of execution, cause the one or more processors to implement various functionality described herein. For example, second client computing entity 206 may include instructions to communicate with server 202. Second client computing entity 206 and server 202 may communicate with each other over a computer network and establish a client-server relationship. However, formally establishing a client-server relationship is not necessarily required in all embodiments. Second client computing entity 206 may have access to a second data set, which may be used as part of a multiparty computation in conjunction with a first data set that is inaccessible to second client computing entity 206 and kept secret from second client computing entity 206, as part of secure multiparty computation protocols described herein.

Shared secret 208 may refer to a cryptographic secret, such as a symmetric key, that is shared between first client computing entity 204 and second client computing entity 206. Furthermore, shared secret 208, according to various embodiments, should be kept secret from all other computing entities, such as server 202. First client computing entity 204 and second client computing entity 206 may establish shared secret 208 in any suitable manner. Various techniques may be utilized to establish shared secret 208, such as those based on Diffie-Hellman key exchange, TLS handshake process, and more. Techniques for establishing shared secret 208 may be discussed in greater detail below, for example, as described below in connection with FIGS. 3-5. A secret key may be a type of cryptographic material that is shared between first client computing entity 204 and second client computing entity 206.

First client computing entity 204 may have access to first data set 210. First data set 210 may refer to a database table or portion thereof. First data set 210 is stored in a SQL database, according to at least one embodiment. First data set 210 may be stored as an in-memory database or retrieved from a persistent storage medium such as a database system hosted on an internal private network of a first organization. In some embodiments, first data set 210 is organized into rows and columns, which may be analogous to fields and records. First data set 210 depicted in FIG. 2 comprises a column of names {Anthony; Bruce; Carol; Henry; Natasha; Stephanie; Steve; Victor} and other columns of data (not illustrated in FIG. 2) may be present. Data of first data set 210 may be any suitable data type, including but not limited to strings, integers, Booleans, bit streams, and more. First data set 210 may be resident in a data store and programmatically retrieved by first client computing entity 204 via a query, such as a SQL query. Shared secret 208 may be used to cryptographically protect first data set 210, or a portion thereof, as part of a secure multiparty computation protocol described herein. First data set 210 may include information that is sensitive, private, confidential, etc., that should otherwise not be divulged to others, such as second client computing entity 206. In some cases, first data set 210 includes personal health information (PHI) and first client computing entity 204 is prohibited from releasing such information without approval. Accordingly, first client computing entity 204, in at least one embodiment, does not share first data set 210 with either server 202 or second client computing entity 206 in a plaintext format that is discernable by such entities.

In at least one embodiment, first cryptographically protected data set 212 is generated using any suitable keyed one-way function. In various embodiment, a keyed-hash message authentication code (HMAC) is generated. An HMAC function may receive, as inputs, a secret key and a message, and generate a hashed output based on the inputs. In some cases, a hash function to use and/or a block size of the hash function may be specified. For example, a cryptographic hash function such as Secure Hash Algorithm 3 (SHA-3) or MD5 may be used to first cryptographically protected data set 210, thereby generating first cryptographically protected data set 212. In some embodiments, the shared secret and data set value are concatenated to form a message that is hashed. For example, shared secret may be selected as a 128-bit value and the row values stored in each row of first data set have a maximum size of 128-bits, then the shared secret and the row value may be concatenated to form a 256-bit input message to a 256-bit cryptographic hash function. In some embodiments, the row values are padded.

First cryptographically protected data set 212 may refer to a transformed version of first data set 210 that is cryptographically protected so that the plaintext contents (e.g., first data set 210) are not discernable from first cryptographically protected data set 212 without additional information. For example, first computing entity 204 may generate first cryptographically protected data set 212 by using a Hash-based Message Authentication Code algorithm to generate cryptographically protected outputs for each row of the first data set 210 and using the shared secret 208. Examples of HMAC functions that may be utilized are HMAC-SHA256 or HMAC-SHA3-512. For example, the shared secret or secret key may be denoted as "k" and the HMAC function as HMAC( ), then cryptographically protected values for first data set 210 may be generated in the following manner:

| Plaintext Values | Corresponding Cryptographically protected Values |
|---|---|
| Anthony | HMAC(k, "Anthony") |
| Bruce | HMAC(k, "Bruce") |
| Carol | HMAC(k, "Carol") |
| Henry | HMAC(k, "Henry") |
| Natasha | HMAC(k, "Natasha") |
| Stephanie | HMAC(k, "Stephanie") |
| Steve | HMAC(k, "Steve") |
| Victor | HMAC(k, "Victor") |

As part of generating first cryptographically protected data set 212, the order of the cryptographically protected values may, should, or must be shuffled or randomized, depending on use cases. As depicted in FIG. 2, first cryptographically protected data set 212 may be generated by HMAC'ing the values of first data set 210 and then re-ordering the cryptographically protected values to randomize the order. Cryptographically protected first data set 212 may comprise one or more columns of cryptographically protected data elements. For example, column 212A may include a list of names that are HMAC'd and shuffled.

In some embodiments, first data set 210 is cryptographically protected via encryption. For example, shared secret 208 may be used as a secret for symmetric cryptography such that each row is encrypted using shared secret 208.

First computing entity 204 may generate or otherwise determine first cryptographically protected data set 212 and transmit first cryptographically protected data set 212 to server 202 for use in a secure multiparty computation. In various embodiments, server 202 lacks access to shared secret 208 and is unable to determine the underlying contents of first cryptographically protected data set 212 or verify whether a particular value is included in first data set 210.

Second client computing entity 206 may have access to second data set 214. Second data set 214 may refer to a database table or portion thereof. Second data set 214 is stored in a SQL database, according to at least one embodiment. Second data set 214 may be stored as an in-memory database or retrieved from a persistent storage medium such as a database system hosted within an internal network of a second organization. In some embodiments, second data set 214 is organized into rows and columns, which may be analogous to fields and records. Second data set 214 depicted in FIG. 2 comprises two columns of values {(Alfred, 1); (Barry, 33); (Bruce, 53); (Clark, 8); (Diana, 45); (Henry, 32); (Stephanie, 16); (Victor, 5)}. Data of second data set 214 may be any suitable data type, including but not limited to strings, integers, Booleans, bit streams, and more. Second data set 214 may be resident in a data store and programmatically retrieved by second client computing entity 206 via a query, such as a SQL query. Shared secret 208 may be used to cryptographically protect second data set 214, or a portion thereof, as part of a secure multiparty computation protocol described herein. Second data set 214 may include information that is sensitive, private, confidential, etc., that should otherwise not be divulged to others, such as first client computing entity 204. Second data set 214 may include personal health information (PHI), personally identifiable information (PII), sensitive or confidential data (e.g., social security numbers), financially sensitive information, and so on.

Cryptographically protected second data set 216 may refer to a cryptographically protected version of second data set 214 that is generated using various cryptographic protection techniques. In some embodiments, first client computing entity 204 and second client computing entity 206 agree upon a column to use to confidentially test set membership. This column may be the names columns depicted in first data set 210 and second data set 214. Second client computing entity 206 may generate a cryptographically protected column of data by HMAC'ing each of the names in names column. In various embodiments, the same technique (e.g., HMAC function) is used by first client computing entity 204 to cryptographically protect its name column and by second client computing entity 206 to cryptographically protect its name column. Second client computing entity may cryptographically protect additional portions of second data set 214 by homomorphic encrypting each data element of a data column according to a homomorphic encryption scheme. Homomorphic encryption (HE) schemes described herein may be leveled HE schemes, and may refer to partially homomorphic encryption schemes. An example of a partial homomorphic encryption scheme is a Paillier or ElGamal cryptosystem.

In at least one embodiment, cryptographically protected second data set 216 is generated by HMAC'ing the names column and encrypting the data payload column according to a homomorphic encryption scheme. In some embodiments, the data payload values is encrypted using a public key of an asymmetric key pair according to the homomorphic encryption scheme, wherein the private key of the asymmetric key pair is kept secret by second client computing entity 206 and inaccessible to first client computing entity 204 and server 202. The public key referenced above may be denoted as $p_B$ (with corresponding private key $s_B$) and HE( ) may denote a homomorphic encryption function according to the homomorphic encryption scheme. Cryptographically protected values of second data set 214 may be generated in the following manner:

| Plaintext Values | Corresponding Cryptographically protected Values |
|---|---|
| (Alfred, 1) | (HMAC(k, "Alfred"), HE($p_B$, 1)) |
| (Barry, 33) | (HMAC(k, "Barry"), HE($p_B$, 33)) |
| (Bruce, 53) | (HMAC(k, "Bruce"), HE($p_B$, 53)) |
| (Clark, 8) | (HMAC(k, "Clark"), HE($p_B$, 8)) |
| (Diana, 45) | (HMAC(k, "Diana"), HE($p_B$, 45)) |
| (Henry, 32) | (HMAC(k, "Henry"), HE($p_B$, 32)) |
| (Stephanie, 16) | (HMAC(k, "Stephanie"), HE($p_B$, 16)) |
| (Victor, 5) | (HMAC(k, "Victor"), HE($p_B$, 5)) |

As part of generating cryptographically protected second data set 216, the order of the cryptographically protected values may be shuffled or randomized. As depicted in FIG. 2, cryptographically protected second data set 216 may be generated by cryptographically protecting each row (e.g., by HMAC'ing the name and homomorphically encrypting the integer) and re-ordering the cryptographically protected values to randomize the order. For example, cryptographically protected data set 216 may comprise a column 216A of names that are HMAC'd and column 216B of integers that are homomorphically encrypted.

Columns of second data set 214 may be cryptographically protected in any suitable manner, including by using keyed one-way functions and cryptographic hash functions discussed above in connection with cryptographically protecting first data set 210.

Second computing entity 206 may generate or otherwise determine cryptographically protected second data set 216 and transmit cryptographically protected second data set 216 to server 202 for use in a secure multiparty computation. In various embodiments, server 202 lacks access to shared secret 208 and is unable to determine the underlying contents of cryptographically protected second data set 216 or verify whether a particular value is included in second data set 214.

In various embodiments, as part of a secure multiparty computation protocol, server 202 obtains first cryptographically protected data set 212 from first computing entity 204 via one or more messages (e.g., HTTP POST) and obtains second cryptographically protected data set 216 from second computing entity 206. As discussed above, server 202 may lack access to shared secret 208. Server 202 may lack, accordingly, obtain a first set of one or more columns of cryptographically protected values from first client computing entity 204 and a second set of one or more columns of cryptographically protected values from second client computing entity 206. Server 202 may lack access to sufficient cryptographic material to determine the manner in which the cryptographically protected values were generated (e.g., server 202 may be unable to determine whether one first column is cryptographically protected using a HMAC function and another column is cryptographically protected using homomorphic encryption).

In at least one embodiment, server 202 comprises one or more processors and memory that stores executable instructions that, as a result of execution, cause the one or more processors to perform a set of computations specified to and agreed upon by first client computing entity 204 and second client computing entity 206. The computation may, for example, involve joining the data sets according to the cryptographically protected name column and determining the sum of the integer values for the intersection. Sever 202 may perform various types of join operations such as inner join, full outer join, left outer join, right outer join, etc. based on the cryptographically protected data sets. Two columns of cryptographically protected data may be joined according to an equivalence relationship wherein the joined data set includes entries based on a cryptographically protected value being in both columns. The clients may specify one or more columns for testing set membership. For example, the cryptographically protected name column of first cryptographically protected data set 212 may include HMAC'd values that can be compared to the cryptographically protected name column of cryptographically protected second data set 216. If two HMAC'd values are equal, it indicates set intersection, although it should be noted that server 202 lacks sufficient cryptographic material to determine additional information relating to the underlying plaintext values that matched. For example, server 202 may determine that the cryptographically protected value HMAC(k, "Bruce") is include in both first cryptographically protected data set 212 and cryptographically protected data set 216, but lacks additional information to determine that "Bruce" is a name that is included in both data sets.

Joined cryptographically protected data set 218 may be computed or otherwise determined by server 202 using first cryptographically protected data set 212 and cryptographically protected second data set 216 to perform a join operation. In FIG. 2, first data set 210 and second data set 214 intersect with respect to four names—"Bruce"; "Victor"; "Stephanie" and "Henry." Accordingly, in various embodiments, the HMAC of these names will be present in both cryptographically protected data sets that server 202 has access to. Based on the HMACs matching, server 202 can determine set intersection and join the cryptographically protected data sets to determine cryptographically protected joined data set 218.

Joined cryptographically protected data set 218 may be used to perform additional computations. In at least one embodiment, joined cryptographically protected data set 218 comprises a subset of cryptographically protected second data set 216 that is defined based on a private set intersection of matching elements in first cryptographically protected data set 212 and cryptographically protected second data set 216. Note, for example, that "Clark" is included second data set 214 and not in first data set 210, and accordingly the entry for "Clark" is absent from joined cryptographically protected data set 218.

In some embodiments, computations are performed on one or more column according to a secure multiparty computation protocol. For example, the protocol may call for server 202 to compute the homomorphic sum of the second column of joined cryptographically protected data set 218 according to the homomorphic encryption scheme that was used to generate the second column of cryptographically protected second data set. Second client computing entity 206 may specify the homomorphic encryption scheme as part of establishing the parameters of the secure multiparty computation protocol.

For example, as depicted in FIG. 2, server 202 has access to the homomorphic encrypted quantities for the integer values 53, 5, 16, and 32, which correspond to the data payload for the names that are included in both data sets. In various embodiment, the homomorphic encryption scheme supports homomorphic addition, which allows the encrypted quantities to be homomorphically added together to produce a homomorphic sum that can be decrypted by second computing entity 206 using a corresponding private key $s_B$.

In at least one embodiment, an asymmetric-key variant of a homomorphic encryption scheme may provide for the following encryption APIs for a security parameter n, wherein the encryption of a plaintext m is denoted by $\boxed{m}$.

$$k_{eval}, k_{sk}, k_{pk} \leftarrow HE.\text{Keygen}(n)$$

$$\boxed{m} \leftarrow HE.\text{Encrypt}(k_{pk}; m)$$

$$m \leftarrow HE.\text{Decrytpt}(k_{sk}; \boxed{m})$$

According to at least one embodiment, $k_{sk}$ refers to the private key of an asymmetric key pair used for decryption, $k_{pk}$ refers to the public key of the asymmetric key pair used for encryption, and $k_{eval}$ refers to an evaluation key that is an abstraction of different public keys used to perform homomorphic computation, including relinearization keys and Galois keys. The asymmetric key pair used for homomorphic encryption and decryption may also be referenced above as $p_B$ and $s_B$.

In various embodiments, the homomorphic encryption scheme used to encrypt the data payload of cryptographically protected second data set 216 may support one or more computation or evaluation APIs on encrypted data. For example, in at least one embodiment, homomorphic addition is supported by the HE scheme such that:

$$\boxed{a} \oplus \boxed{b} = \boxed{c}, \text{ where } a+b=c$$

Accordingly, server 202 may perform HE computations 220 to compute the homomorphic sum of the encrypted quantities to determine the private set intersection on behalf of the clients.

$$\boxed{53} \oplus \boxed{5} \oplus \boxed{16} \oplus \boxed{32} = \boxed{106} \text{ as depicted in FIG. 2}$$

The homomorphic sum 222-$\boxed{106}$ as depicted in embodiments according to FIG. 2—may be computed by server 202 and transmitted to second client computing entity 206. HE key 224 depicted in FIG. 2 may refer to $s_B$ or a symmetric key that is usable to decrypt homomorphic sum 220. Second client computing entity 206 may decrypt the homomorphic sum to determine the plaintext sum:

$$106 \leftarrow HE.\text{Decrytpt}(s_B; \boxed{106})$$

Accordingly, second client computing entity 206 is able to receive an encrypted version of the private set intersection sum from server 202. Server 202 lacks sufficient information to determine the plaintext sum, and second client computing entity 206 lacks sufficient information to determine which members of second data set 214 were used to compute the sum. Accordingly, data privacy is enhanced using techniques described in FIG. 2—server 202 does not have access to either plaintext versions of first data set 210 or second data set 214; first client computing entity 204 cannot infer any information regarding second data set 214; and second client computing entity 206 cannot infer the sum of the integer column where the names are in common, but cannot infer any information regarding which names were included in both first data set 210 and second data set 214.

Techniques for implementation homomorphic encryption APIs and evaluation APIs may be in accordance with those described in "A Low-Depth Homomorphic Circuit for Logistic Regression Model Training" by E. Crockett, which is incorporated herein by reference.

Figure 3:
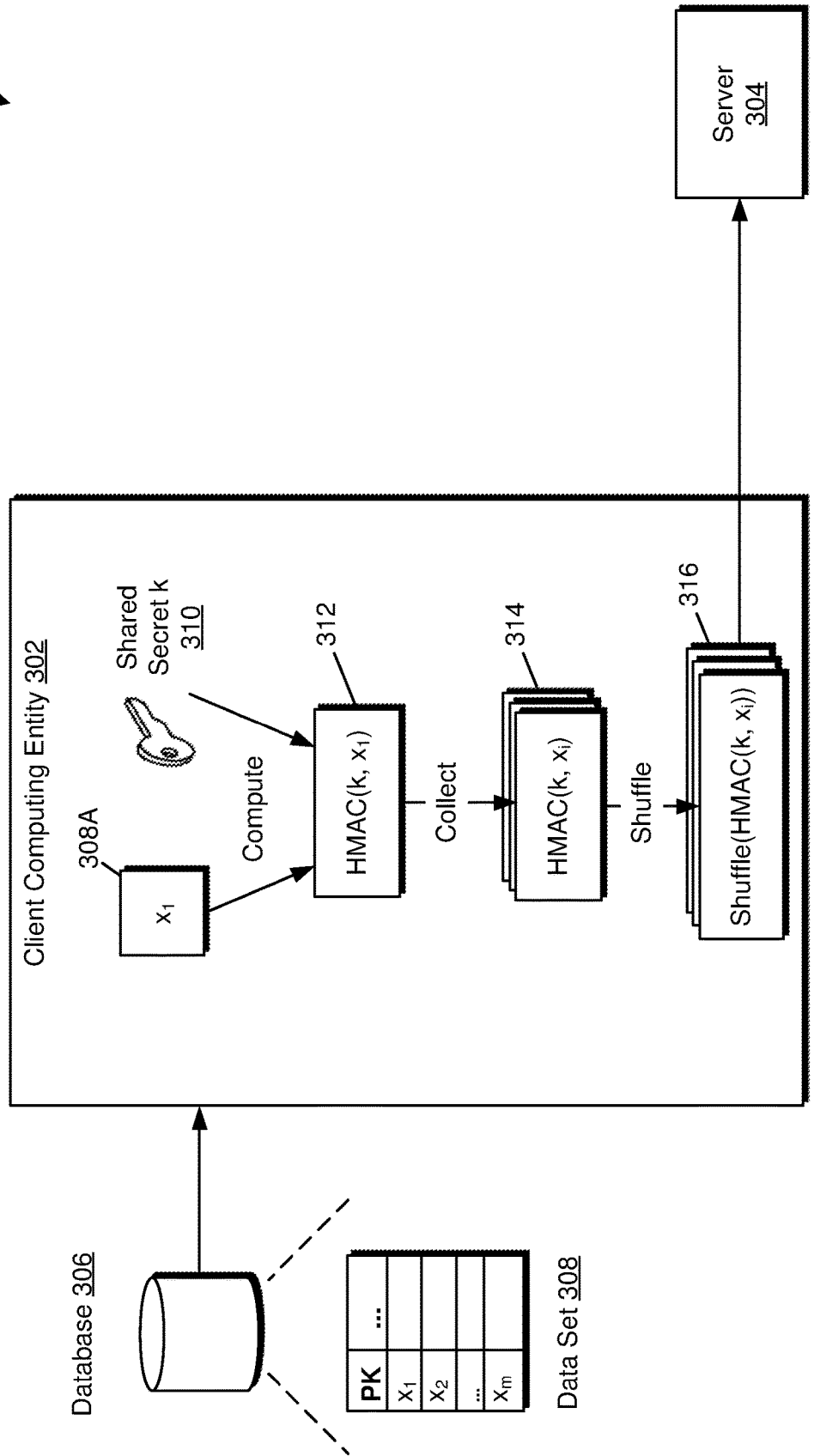
FIG. 3 illustrates a computing environment in which techniques to generate a cryptographically protected data set are implemented, in accordance with one or more example embodiments of the present disclosure.

FIG. 3 illustrates a computing environment 300 in which techniques to generate a cryptographically protected data set are implemented, in accordance with one or more example embodiments of the present disclosure. Computing environment 300 may be implemented in connection with systems and methods discussed in connection with FIGS. 4 and 5.

In at least one embodiment, FIG. 3 depicts a computing environment 300 in which techniques to generate a cryptographically protected data set are implemented. Client computing entity 302 may generate a cryptographically protected data set and provide the cryptographically protected data set to server 304.

Client computing entity 302 may refer to one or more computer systems and may be implemented as a hardware system (e.g., machine), such as those described in connection with FIG. 9. In various embodiments, client computing entity 302 comprises one or more processors and memory storing executable instructions that, as a result of execution, cause the one or more processors to implement various functionality described herein. For example, client computing entity 302 may include instructions to communicate with database 306 to obtain data set 308, generate a cryptographically protected data set, and transmit the cryptographically protected data set to server 304.

Database 306 may refer to a database system or database service. While a database 306 is depicted in FIG. 3, other types of data stores may be utilized in accordance with techniques described in accordance with FIG. 3, including but not limited to unstructured data stores, key-value stores, and more. Database 306 may support one or more interfaces that may be used by client computer system 302 to submit queries for data and to obtain such data. For example, database 306 may be implemented as a SQL database that supports database queries to create, read, update, and delete data in the database 306. In various embodiments, database 306 is organized by tables, and each table may, in turn, have a table schema that defines the columns—or fields—that are supported by the database table. Data entries in a table may be referred to as rows—or records—of the database table, and may encode values for the individual fields. In various embodiments, field values may be any suitable data type, including but not limited to strings, integers, Booleans, bit streams, and more. A database table may have a column that is designated a primary key (PK) column wherein each value of the primary key column is unique or may otherwise be used to uniquely identify a particular row of the database table.

Data set 308 may refer to data of database 306. For example, data set 308 may be a subset of a database table of database 306 that is obtained from a query submitted by client computing entity 302. Data set 308 may be any suitable partition of database 306. In some embodiments, data set 308 may be a data set obtained from a database operating joining two database tables together according to a query (e.g., SQL JOIN). Data set 308 may include one or more rows of data—for example, as depicted in FIG. 3, data set 308 may include data form rows that is represented as $x_1$, $x_2, \ldots x_m$. These values, in at least some embodiments, are unique values. For example, the first data set depicted in FIG. 2 may be in accordance with the data set 308 described herein. In some embodiments, database 306 is a data store that is accessible to client computing entity 302 via a private network. For example, an organization may store sensitive data on a database 306 that is accessible via a private intranet that is accessible to the organization but not accessible to the public at large. In some embodiments, database 306 cannot be directly accessed by server 304.

In various embodiments, client computing entity 302 submits one or more requests (e.g., SQL queries) to database 306 and obtains data set 308 from database 306. Data set 308 may comprise one or more columns. Some or all columns may be specified for testing set membership in a private (e.g., confidential manner) such that server 304 performs the set membership test while lacking sufficient information to determine the underlying contents of any elements being tested for common set membership. In at least one embodiment, data element 308A depicted in FIG. 3 is an illustrative row value of data set 308. Data element 308A and a shared secret 310 may be used to compute a cryptographically protected data element 312.

Client computing entity 302 comprises memory storing executable code that, as a result of execution by one or more processors, causes the one or more processors to generate a cryptographically protected data set, according to at least one embodiment. A cryptographically protected data set may be generated according to techniques described in greater detail below, and in accordance with FIG. 3, according to at least one embodiment.

In at least one embodiment, client computing entity 302 stores or otherwise has access to shared secret 310. Shared secret 310 may refer to a cryptographic secret, such as a symmetric key, that is shared between client computing entity 302 and one or more other computing entities that control data that is to be used for secure multiparty computation. Shared secret 310 may be inaccessible to or otherwise kept secret from server 304—in other words, server 304 may lack access to shared secret 310. Client computing entity and another computing entity may agree upon shared secret 310 in any suitable manner. For example, two computing entities (referred to herein as party A and party B) may publicly agree upon a prime number p and base g that is a primitive root modulo p. These quantities may be made public and does not necessarily need to be kept secret. Parties A and B may furthermore generate private keys a and b, respectively, and keep the private keys secret from other parties. Party A with private key a may generate $A=g^a$ mod p and send A to party B with private key b. Party B receives A and then compute $A^b$ mod p. Likewise, party B computes $B=g^b$ mod p and sends B to party A, and party A then computes $B^a$ mod p. As $A^b$ mod $p=g^{ab}$ mod $p=g^{ba}$ mod $p=B^a$ mod p, a shared secret $g^{ab}$ mod p is established between the parties that is inaccessible to other parties lacking access to at least one of the private keys, even if they are able to eavesdrop on the communications between the parties A and B.

In general, and according to at least one embodiment, shared secret 310 may be a secret value that is shared among a plurality of computing entities and is inaccessible to server 304 that performs a secure multiparty computation that involves a private set intersection. Shared secret 310 may be shared among three parties when a secure multiparty computation involves the private set intersection of three sensitive/private data sets that are respectively owned by the respective parties, for example. Larger groups of computing entities may jointly agree upon shared secret 310 or use other protocols to securely establish and share the secret value k. Various techniques may be utilized to establish the shared secret 310, such as those based on Diffie-Hellman key exchange, TLS handshake process, and more.

A data element of data set 308 (e.g., data element 308A) and shared secret 310 may be used to compute a cryptographically protected data element 312, according to at least one embodiment. In at least one embodiment, a cryptographically protected data element is generated using a Hash-based Message Authentication Code (HMAC) algorithm. In FIG. 3, and according to at least one embodiment, cryptographically protected data element 312 is generated based on a plaintext data element $x_1$ and shared secret k in the following manner:

$$HMAC(k, x_1)$$

Likewise, a second cryptographically protected data element may be generated for second plaintext data element $x_2$ by using the same HMAC function and same shared secret k: $HMAC(k, x_2)$. In at least one embodiment, a cryptographically protected data element is generated using any suitable keyed one-way function. For example, a keyed cryptographic hash function such as KMAC256 and other keyed hash functions derived from Secure Hash Algorithm 3 (SHA-3) may be used to cryptographically protect data element 308A, thereby generating cryptographically protected data element 312. In some embodiments, the shared secret 310 and data element 308A are concatenated to form a message that is used as the input to a one-way function. For example, shared secret 310 may be selected as a 128-bit value and data element 308A is padded (if necessary) to be a 128-bit value, then the shared secret 310 and the (possibly padded) data element are concatenated to form a 256-bit input message and provided as the input to a 256-bit cryptographic hash function. In some embodiments, data element 308A may natively be sized to 128 bits and padding is not needed. The example described above is merely illustrative in nature, and techniques for cryptographically protecting a data element (e.g., using other sizes and combinations of sizes of data elements) are contemplated within the scope of this disclosure. In some embodiments, a cryptographic salt may be used as part of a message that is hashed or otherwise cryptographically protected.

In some embodiments, data element 308A is cryptographically protected via encryption. For example, shared secret 310 may be used as a secret for symmetric cryptography such that cryptographically protected data element 312 is a ciphertext generated by encrypting data element 308A using secret key 310.

FIG. 3 depicts how a first data element $x_1$ may be cryptographically protected to generate a first cryptographically protected data element 312. A second data element $x_2$ may be cryptographically protected in a similar manner. For example, a second cryptographically protected data element may be generated based on a plaintext data element $x_2$ and shared secret k in the following manner:

$$HMAC(k, x_2)$$

In various embodiments, an array of cryptographically protected data elements 314 is determined by cryptographically protecting a plurality of data elements from data set 308. Array of cryptographically protected data elements 314 may be generated in a parallelized manner by computing cryptographically protected data elements for data set 308 in a parallelized or multi-threaded fashion. In at least one embodiment, data elements $x_1, \ldots, x_m$ are cryptographically protected to produce array of cryptographically protected data elements 314 comprising cryptographically protected data elements $HMAC(k, x_1), \ldots HMAC(k, x_m)$. In various embodiments, array of cryptographically protected data elements 314 is organized in the same order as data set 308.

In various embodiments, array of cryptographically protected data elements 314 is shuffled to produce a cryptographically protected data set 316. A cryptographically protected data set 316 may refer to an array of cryptographically protected data elements wherein the order of elements within the array have been shuffled or randomized so that the order of elements in cryptographically protected data set 316 are uncorrelated or practically uncorrelated to the order of data elements in data set 308.

Accordingly, cryptographically protected data set 316 may be transmitted by client computing entity 302 to server 304 as part of a secure multiparty computation protocol. Cryptographically protected data set 316 may be transmitted over a communications channel that lacks assurances of confidentiality. For example, cryptographically protected data set 316 may be transmitted over a communications channel along with a digital signature or message digest that provides the recipient (e.g., server 304) a mechanism for determining the authenticity and integrity of the data that is actually received. In this way, the security of the protocol is not comprised even if another party is somehow able to maliciously or inadvertently gain access to cryptographically protected data set 316. Cryptographically protected data set 316 may be used to perform secure multiparty computations according to protocols such as those described in connection with FIGS. 1, 2, and 8.

Figure 4:
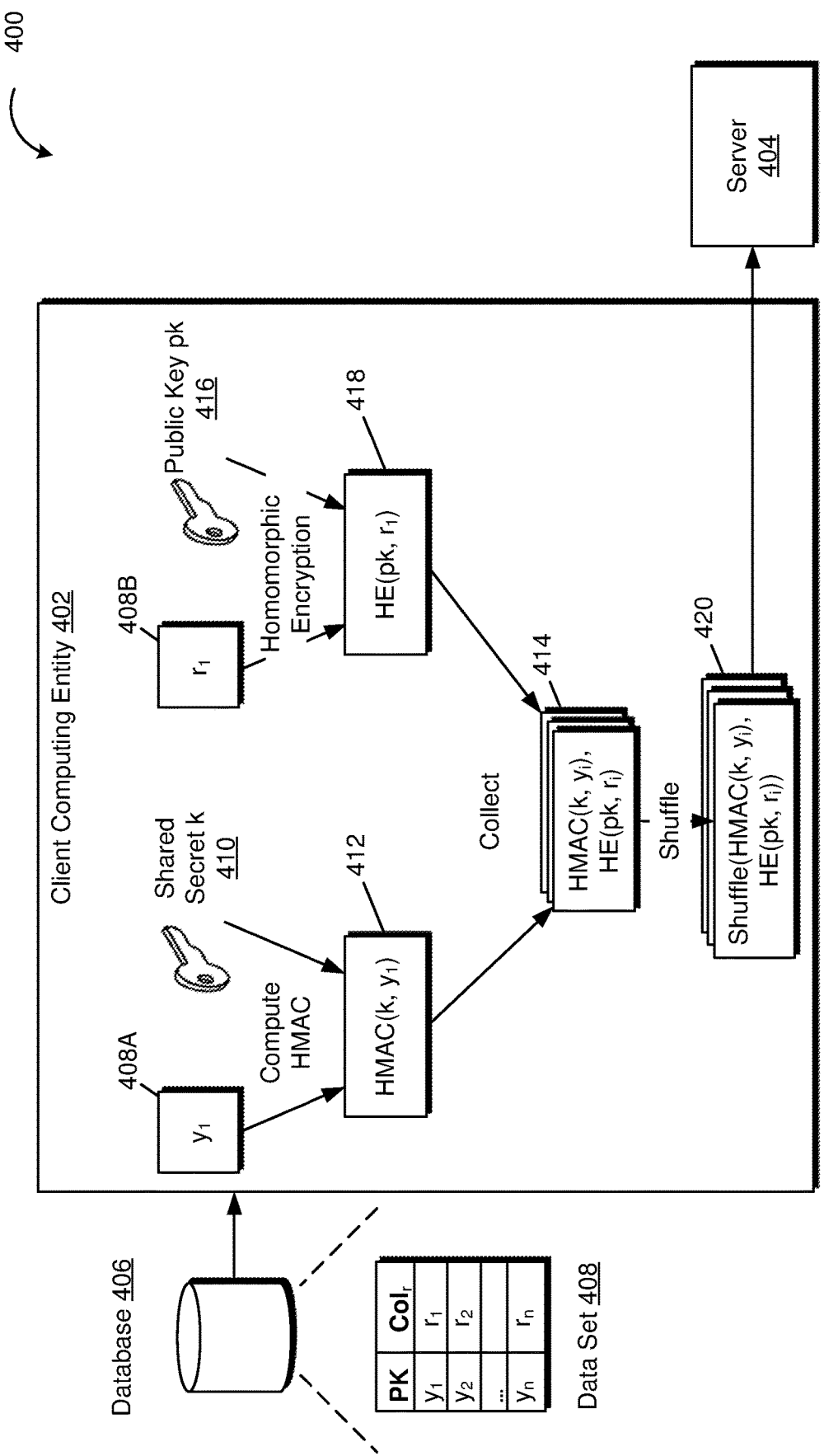
FIG. 4 illustrates a computing environment in which techniques to generate a cryptographically protected data set are implemented, in accordance with one or more example embodiments of the present disclosure.

FIG. 4 illustrates a computing environment 400 in which techniques to generate a cryptographically protected data set are implemented, in accordance with one or more example embodiments of the present disclosure. Computing environment 400 may be implemented in connection with systems and methods discussed in connection with FIGS. 3 and 5.

In at least one embodiment, FIG. 4 depicts a computing environment 400 in which techniques to generate a cryptographically protected data set are implemented. Client computing entity 402 may generate a cryptographically protected data set and provide the cryptographically protected data set to server 404. The cryptographically protected data set may be used in a secure multiparty computation protocol that performs computations on confidential data that should not be accessible in a plaintext format to parties of the secure multiparty computation outside of client computing entity 402.

Client computing entity 402 refers to one or more computer systems implemented as a hardware system (e.g., machine) such as those described in connection with FIG. 9, according to at least one embodiment. In various embodiments, client computing entity 402 comprises one or more processors and memory storing executable instructions that, as a result of execution, cause the one or more processors to implement various functionality described herein. For example, client computing entity 402 may include instructions to communicate with server 404 to implement a secure multiparty computation protocol. Client computing entity 402 and server 404 may communicate with each other over a computer network and establish a client-server relationship. However, formally establishing a client-server relationship is not necessarily required in all embodiments. Client computing entity 402 may have access to a data set, which may be used as part of a multiparty computation in conjunction with a different data set that is inaccessible to client computing entity 402 and kept secret from client computing entity 402, as part of secure multiparty computation protocols described herein.

Database 406 may be implemented in accordance with techniques described in connection with FIG. 3. For example, database 406 may comprise one or more tables and may be accessible via queries or requests to obtain data from database 406. Data set 408 may refer to a portion of data obtained from database 406, for example, in response to a query or request, such as a SQL query to a SQL database server. In various embodiments client computing entity 402 has access to database 406 but server 404 and other computing entities participating in a secure multiparty computation protocol lack access to database 406.

In various embodiments, data set 408 refer to data obtained from database 406. Data set 408 may include data from one or more database tables, which may be obtained through joining two database tables according to a query. FIG. 4 depicts an illustrative example of a data set 408 comprising data that should be used as part of a secure multiparty computation protocol but not exposed to other computing entities in a plaintext format. For example, and according to at least one embodiment, $y_i$ is utilized as part of a private set intersection to test for set membership against another set of private data, and $r_i$ includes data that should be computed if and only if row i intersects.

A first row of data set 408 may comprise a first data element 408A and second data element 408B. Shared secret 410 may be in accordance with those described in connection with FIGS. 1 and 2. First data element 408A may refer to field values $y_1, \ldots, y_n$ of a first column of data set 408. For example, first data element $y_1$ and shared secret k may be used to generate cryptographically protected data element 412 in the following manner:

$$HMAC(k, y_2)$$

Cryptographically protected data element 412 may be generated using other suitable techniques described throughout this disclosure, such as examples described in which other keyed one-way functions or cryptographic hashes are utilized.

Second data element 408B may refer to field values $r_1, \ldots, r_n$ of a second column of data set 408. The second data column may comprise sensitive or private data that may be subject to computations (e.g., addition or multiplication) by server 404. In various embodiments, second data element 408B is cryptographically protected to prevent server 404 and other computing entities from having access to the plaintext value or contents of second data element 408B.

In various embodiments, second data element 408B is encrypted according to a homomorphic encryption scheme. Homomorphic encryption (HE) schemes described herein may be leveled HE schemes, and may refer to partially homomorphic encryption schemes. For example, Cheon-Kim-Kim-Song (CKKS) HE scheme may be utilized in at least one embodiment. In various embodiments, a partial HE scheme implements both homomorphic addition and homomorphic multiplication, as well as other operations such as cyclic rotation and addition/multiplication by scalar plaintexts.

Second data element 408B may be encrypted according to a HE scheme using a cryptographic key such as public key 416. Asymmetric and symmetric encryption variants may be utilized. For symmetric encryption, the same cryptographic key is used for encryption and decryption, and is kept secret from other parties such as server 404. For symmetric encryption, public key pk is used for encryption and a corresponding private key sk is used for decryption and is kept secret from other parties such as server 404.

In at least one embodiment, second data element 408B is encrypted using private key 416 according to a HE scheme to produce cryptographically protected data element 418. It is noted that data may be cryptographically protected using various techniques—for example, a first cryptographically protected data element 412 may be cryptographically protected using a HMAC or cryptographic hash function to protect first data element 408A and a second cryptographically protected data element 418 may be cryptographically protected using a HE encryption function to protect second data element 408B. As illustrated in FIG. 4, a HE encryption function HE( ) may be used to encrypt second data element 408B under public key 416, for example, in the following manner:

$$HE(pk, r_1)$$

Data set 408 may include additional data columns that are also cryptographically protected using a HE scheme. In various embodiments, a tuple of information for a row of data is determined. For example, a tuple of information for a row of data from data set 408 may be according to the form:

$$(HMAC(k, y_1), HE(pk, r_i), \ldots)$$

Tuples may be generated for each row of data set 408 to produce an array 414 of cryptographically protected tuples. Array 414 of cryptographically protected tuples may be shuffled to have a random order, for example, as discussed in connection with FIG. 3, to produce cryptographically protected data set 420. Cryptographically protected data set 420 may be viewed as a matrix of cryptographically protected data elements organized in a first column of HMAC'd data elements such as HMAC(k, $y_i$), second column with homomorphically encrypted data elements such as HE(pk, $r_i$), and so on. Shuffling may refer to a technique for randomizing the order of the rows so that the order in which rows of data appear in data set 408 cannot practically be determined based on the order of rows in cryptographically protected data set 420.

Cryptographically protected data set 420 may be transmitted to server 404 according to a secure multiparty computation protocol, for example, using techniques discussed in connection with FIG. 3. In some embodiments, client computing entity 402 sends configuration and/or metadata to server 404 indicating how each column of cryptographically protected data set 420 are to be used in a secure multiparty computation. For example, client computing entity 402 may provide metadata specifying that the first column of cryptographically protected data elements (e.g., HMAC'd data elements) are to be used to determine private set intersection and the second column of cryptographically protected data elements (e.g., homomorphically encrypted data elements) are to be summed together if they are part of the intersecting set.

Figure 5:
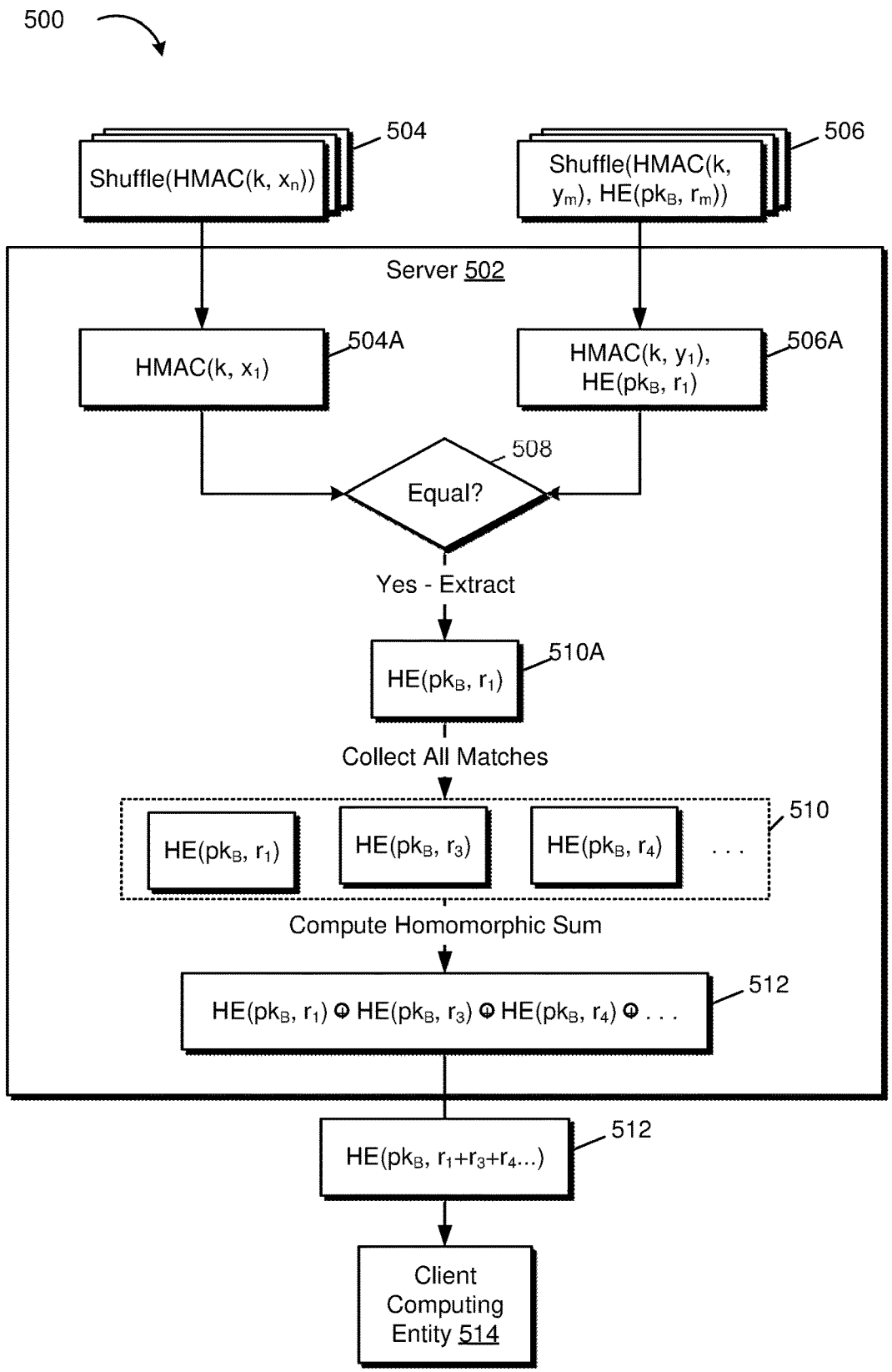
FIG. 5 illustrates a computing environment in which techniques to perform secure multiparty computations according to a protocol, in accordance with one or more example embodiments of the present disclosure.

FIG. 5 illustrates a computing environment 500 in which techniques to perform secure multiparty computations according to a protocol, in accordance with one or more example embodiments of the present disclosure. Computing environment 500 may be implemented in connection with systems and methods discussed in connection with FIGS. 1-4.

Server 502 may refer to one or more computer systems, such as those described in connection with FIGS. 1, 2, 8, and 9. Server 502 may be implemented in the context of a computing resource service provider and may include one or more processors and memory that, as a result of execution, causes the one or more processors to receive and/or process requests from clients such as client computing entities described in connection with FIGS. 3 and 4. Server 502 may receive requests, commands, messages, etc. from clients in the form of a web service application programming interface (API) request. Server 502 may include executable code to communicate with other computing resources, such as scalable compute services, which may be used to expedite the execution of secure multiparty computations. In some embodiments, server 102 is tasked with conceptually performing a join (e.g., inner join) of the names in first data set and second data set summing the integer values of the matching rows, while preserving the confidentiality of the contents of the first data set and second data set.

In at least one embodiment, server 502 receives first cryptographically protected data set 504 from a first computing entity and receives second cryptographically protected data set 506 from a second computing entity, according to a three-party MPC protocol. Data received or otherwise obtained by server 502 may be in a cryptographically protected format such that server 502 lacks sufficient information to determine how to ascertain the underlying contents of the cryptographically protected data that server 502 receives.

Server 502 may obtain a first cryptographically protected data element 504A from first cryptographically protected data set 504 and obtain second cryptographically protected data element 506A from second cryptographically protected data set 506. The order in which cryptographically protected data elements are selected from the cryptographically protected data sets may be immaterial, as the order of the cryptographically protected data elements have already been randomized, in at least one embodiment.

Server 502 may execute compute code to compare 508 first cryptographically protected data element 504A with second cryptographically protected data element 506A. This comparison may be a privacy-preserving comparison as it compares cryptographically protected data elements and does not involve the server 502 having access to the plaintext data elements. A match (e.g., equality) between first cryptographically protected data element 504A and second cryptographically protected data element 506A indicates an intersection between an element in the first data set and the second data set—that is, there is a common element between the two. However, server 502 lacks sufficient cryptographic material or other information to ascertain the plaintext contents of the matching element. If the two cryptographically protected data elements 504A and 506A do not match, then a search for set intersection may continue by comparing other data elements of the cryptographically protected data sets until a match is detected. However, if data elements 504A and 506A match (e.g., equal to each other), then third cryptographically protected data element 510A may be extracted. Second cryptographically protected data element 506A, and third cryptographically protected data element 510A may originate from the same row of data or otherwise be associated with each other. A secure MPC protocol may indicate how to obtain third cryptographically protected data element 510A based on second cryptographically protected data element 506A indicating set intersection. For example, cryptographically protected data set 506 may comprise multiple columns wherein second cryptographically protected data element 506A and third cryptographically protected data element 510A are situated in the same row.

In various embodiments, every cryptographically protected data element HMAC(k, $x_{1 \ldots n}$) is compared against every data element HMAC(k, $y_{1 \ldots m}$) to detect matches. In some embodiments, suitable optimizations may be applied to reduce the number of comparisons that need to be made to be less than n*m comparisons. For example, vectors of HMAC'd values can be sorted to facilitate for faster comparisons in O(n log n) time. For each match, corresponding cryptographically protected data element HE($pk_B$, $r_k$) may be recorded wherein:

$HMAC(k, y_k) = HMAC(k, x_i)$ for $1 \le i \le n$

A subset 510 of cryptographically protected data elements may be obtained. The subset 510 may be defined according to a secure MPC protocol based on any suitable type of set intersection, including but not limited to inner join, full outer join, full right join, and full left join. FIG. 5 illustrates a non-limiting example in which an inner join is used to identify the cryptographically protected data elements that should be included in subset 510.

An illustrative example of determining subset 510 is provided below:

Consider an example with a first cryptographically protected data set (e.g., as depicted in FIG. 2):

|   | Cryptographically Protected Name Column |
|---|---|
| 1 | HMAC(k, "Natasha") |
| 2 | HMAC(k, "Henry") |
| 3 | HMAC(k, "Stephanie") |
| 4 | HMAC(k, "Steve") |
| 5 | HMAC(k, "Anthony") |
| 6 | HMAC(k, "Carol") |
| 7 | HMAC(k, "Bruce") |
| 8 | HMAC(k, "Victor") |

And a second cryptographically protected data set:

|   | Cryptographically Protected Name Column | Cryptographically Protected Value Column |
|---|---|---|
| 1 | HMAC(k, "Bruce") | $HE(pk_B, 53)$ |
| 2 | HMAC(k, "Clark") | $HE(pk_B, 8)$ |
| 3 | HMAC(k, "Victor") | $HE(pk_B, 5)$ |
| 4 | HMAC(k, "Stephanie") | $HE(pk_B, 16)$ |
| 5 | HMAC(k, "Alfred") | $HE(pk_B, 1)$ |
| 6 | HMAC(k, "Barry") | $HE(pk_B, 33)$ |
| 7 | HMAC(k, "Diana") | $HE(pk_B, 45)$ |
| 8 | HMAC(k, "Henry") | $HE(pk_B, 32)$ |

As can be seen in the table above, the first, third, fourth, and eighth entries of second cryptographically protected data set intersect. Server 502 may compare the HMAC'd names of the two data sets and perform an inner join of the two data sets on the cryptographically protected name column to determine:

| Cryptographically Protected Name Column | Cryptographically Protected Value Column |
|---|---|
| HMAC(k, "Bruce") | $HE(pk_B, 53)$ |
| HMAC(k, "Victor") | $HE(pk_B, 5)$ |
| HMAC(k, "Stephanie") | $HE(pk_B, 16)$ |
| HMAC(k, "Henry") | $HE(pk_B, 32)$ |

The cryptographically protected value column may correspond to the subset 510 depicted in FIG. 5.

A homomorphic sum 512 may be computed from subset 510. The homomorphic sum may be computed as the homomorphic addition of every cryptographically protected data element in subset 510. Continuing with the example above, server 502 may compute a homomorphic sum by performing homomorphic addition (denoted as +) on the homomorphically encrypted values:

$HE(pk_b, r_1) \oplus HE(pk_b, r_3) \oplus HE(pk_b, r_4) \ldots$

The homomorphic sum 512 computed by homomorphic addition of the homomorphically encrypted elements are equal to the homomorphically encrypted sum of the plaintext elements:

$HE(pk_b, r_1 + r_3 + r_4 \ldots)$

Homomorphic sum 512 may be transmitted by server 502 to client computing entity 514 according to a secure MPC protocol. In various embodiments, client computing entity 514 provided second cryptographically protected data set 506 to sever 502 and has access to private key $sk_B$ that was corresponds to public key $pk_B$ that was used to homomorphically encrypt the data set values $r_1, \ldots r_m$. In some embodiments, symmetric key cryptography is used wherein the same key is used by client computing entity 514 for homomorphic encryption and decryption and the symmetric key is kept secret from server 502. Client computing entity 514 may receive encrypted the homomorphic sum 512 and decrypt the homomorphic sum to determine the result of the secure MPC protocol. For example, the result may be the summation of the data values for all rows where there was a match between the first and second plaintext data set. It should be noted that client computing entity 514 is provided with the sum only, and does not have any additional information regarding which rows were used to compute the sum. In large data sets, there may be such a large number of combinations that client computing entity 514 is not able to determine with certainty as to which rows were used in the computation, and therefore, the set intersection between first and second data sets is kept private from all parties participating in the secure MPC protocol.

Figure 6:
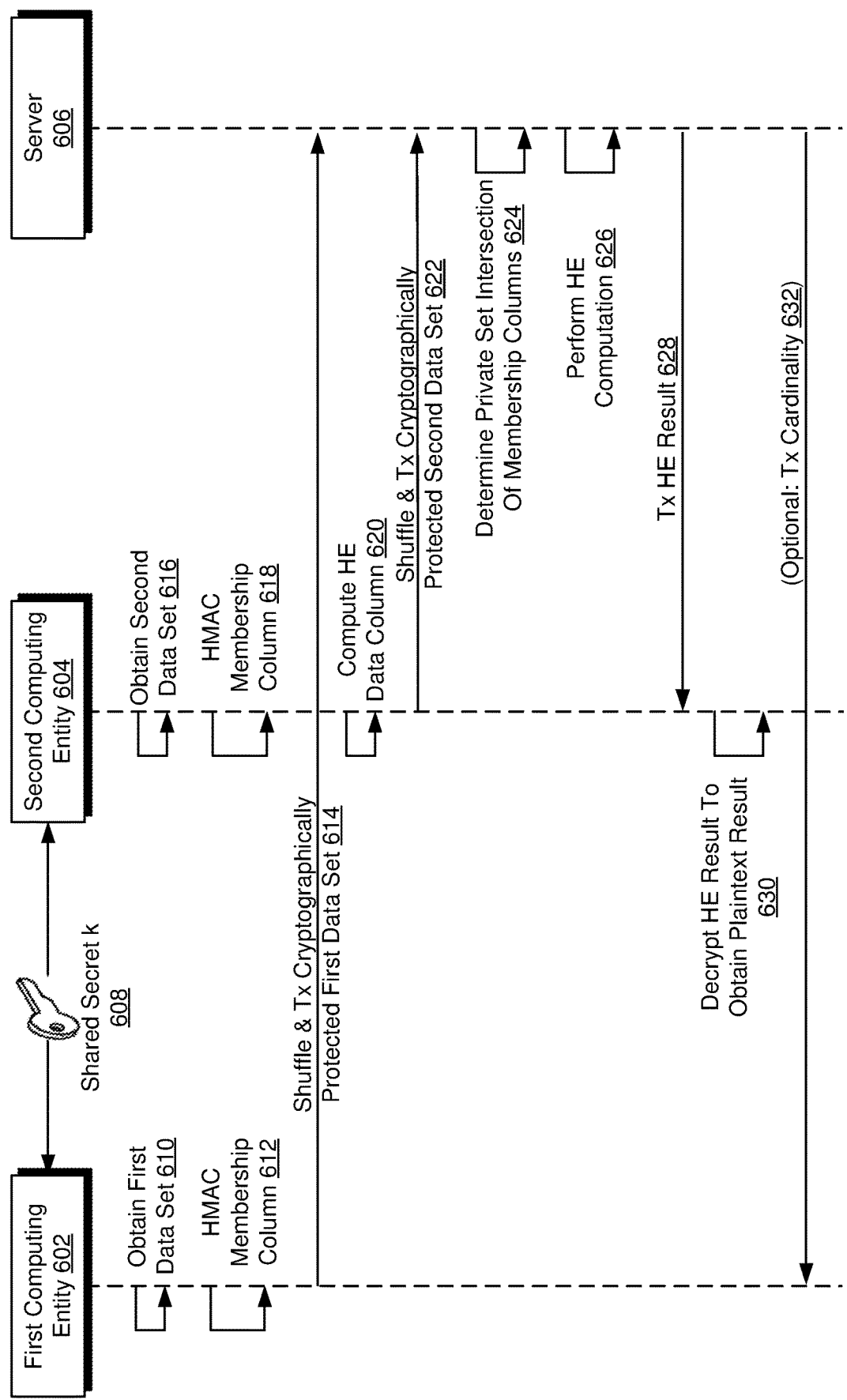
FIG. 6 illustrates a swim diagram in which a secure multiparty computation protocol may be implemented, in accordance with one or more example embodiments of the present disclosure.

FIG. 6 illustrates a swim diagram 600 in which a secure multiparty computation protocol may be implemented, in accordance with one or more example embodiments of the present disclosure. FIG. 6 may be implemented in the context of various computing environments described herein, including those discussed in connection with FIGS. 1-5 and 8.

A secure MPC protocol may involve first computing entity 602, second computing entity 604, and server 606. These computing entities may be implemented as computer systems such as those described in connection with FIG. 9. In at least one embodiment, each computing entity is controlled by a separate organization. First computing entity 602 may be controlled by a first organization with a first set of private/sensitive data that should not be made accessible to second computing entity 604 and server 606 in a plaintext format. Second computing entity 604 may be controlled by a second organization with a second set of private/sensitive data that should not be made accessible to first computing entity 602 and server 606 in a plaintext format.

In at least one embodiment, first computing entity and second computing entity 604 establish a shared secret 608 between each other that is not known (e.g., inaccessible) to server 606. The secret may be established through the exchange of generator parameters such that the shared secret can be computing using (a) a first private key of first computing entity with a second public key of second computing entity; or (b) a first public key of first computing entity with a second private key of second computing entity.

First computing entity may obtain first data set 610. The first data set may refer to a database table or portion thereof with sensitive/private information that should not be shared with other computing entities. The first data set may comprise a membership column. A membership column may refer to a column or list of data that should be compared against a corresponding membership column of second computing entity 604 in a privacy preserving manner. Privacy preservation may be defined according to the secure MPC protocol—for example, in some cases, overlapping elements that are found in both data sets may be made known to one or both clients. In some cases, the overlapping elements are not made known while a computation performed on the overlapping elements, such as summing the overlapping elements, performing a logistic regression on the overlapping elements, and so on.

First computing entity may HMAC the membership column 612 of the first data set. An HMAC function may refer to an illustrative example of a type of keyed one-way function that may be used to cryptographically protect the contents of the membership column. In various embodiments, any suitable keyed one-way function may be used to cryptographically protect data of the first data set so that any party that receives the output of the keyed one-way function is not able to practically reverse engineer the input that produced the output. Each data element of a membership column may be individually HMAC'd. In various embodiments, the data elements of the membership column are transformed in a one-way or effectively one-way manner and based at least in part on shared secret 608. For example, shared secret 608 may be used as an input alongside the data elements of the membership column to produce the HMAC'd outputs.

In various embodiments, first computing entity HMAC's each data element of a membership column and then randomizes the order of the HMAC outputs. Once all membership columns have been HMAC'd and all data columns encrypted (if applicable), the resulting rows of data are shuffled and randomized to form first cryptographically protected data set. The first cryptographically protected data may be transmitted 614 from first computing entity 602 to server 606. In various embodiments, first computing entity 602 specifies the use of a column—for example, first computing entity 602 may also transmit metadata indicating that the HMAC'd membership column should be used to test set membership. First computing entity 602 may withhold information regarding the underlying contents of the membership column (e.g., whether it includes names, social security numbers, credit cards, or other types of data) and such information may be unknown to server 606.

As part of a secure MPC protocol, second computing entity 604 may obtain second data set 616. The second data set may be a database table or portion thereof obtained via a database query request. The database table may be organized into rows and columns. In at least one embodiment, the second data set includes at least two columns—a membership column and a data column. The membership column may refer to a first column of private/sensitive data that second computing entity 604 wishes to use in conjunction with a data set from first computing entity 602, but the contents should be kept confidential from other parties according to a secure MPC protocol. The same function may be used to cryptographically protect membership columns for both first computing entity 602 and second computing entity 604. For example, second computing entity 604 may HMAC its membership column 618.

Second data set may further comprise one or more data columns. Second computing entity 604 may homomorphically encrypt the data column 620 by encrypting each data element of the data column individually. The resulting ciphertext may be decryptable by second computing entity 604 using a secret (e.g., private key) that is inaccessible to other parties of a secure MPC protocol.

Second computing entity 604 may, accordingly, produce two or more columns of cryptographically protected data elements that are randomized/shuffled to produce a second cryptographically protected data set which is transmitted 622 to server 606.

Server 606 may receive both a first cryptographically protected data set and cryptographically protected second data set from first computing entity 602 and second computing entity 604, respectively. Server 606 may perform a set of multiparty computations according to a secure MPC protocol. As an example, the secure MPC protocol may instruct server 606 to perform an inner join of the two cryptographically protected data sets and then compute the sum of a data column. Other types of computations may be performed by server 606.

In at least one embodiment, private set intersection sum is depicted in FIG. 6 where server 606 determines a private set intersection of HMAC'd columns 624 by identifying each cryptographically protected data element of a first membership column of first cryptographically protected data set that matches a corresponding cryptographically protected data element of a second membership column of second cryptographically protected data set. The cryptographically protected data sets may be provided by separate parties to server 606 such that cryptographically protected data set received from one client is not shared with another client (e.g., a client with access to shared secret 608 does not have access to cryptographically protected data sets generated by any other client).

To perform private set intersection sum, server 606 may, after identifying the matching columns, perform homomorphic computations 626. The HE computations may be performed on the result of the private set intersection. For example, the HE computation may involve computing a homomorphic sum over each cryptographically protected data column for the intersecting rows. It should be noted that clients are not required under the secure MPC protocol to provide any information to server 606 regarding what type of content is provided in each column—for example, server 606 may be unaware of whether a cryptographically protected membership column encodes names, social security numbers, credit cards, etc. or whether a cryptographically protected data column encodes financial information, health records, integers, floating points, etc.

Server 606 may transmit 628 the computed HE result (e.g., HE sum) to second computing entity 604 as part of a secure MPC protocol. As discussed above, in various embodiments, second computing entity 604 may have access to cryptographic material that may be used to encrypt and decrypt quantities according to a HE scheme. The received HE result may accordingly be decrypted by second computing entity 630 to obtain the plaintext result, and accordingly, the plaintext result (e.g., plaintext sum) is known by second computing entity 604 and not known by server 606 and first computing entity 602.

A secure MPC protocol may specify additional information. In some embodiments, a secure MPC protocol may specify that server 606 is to provide first computing entity 602 information, such as the cardinality of the intersecting set (e.g., transmit cardinality 632 of intersecting set). A secure MPC protocol agreed upon by first computing entity 602 and second computing entity 604 may specify one or more computation results to provide to first computing entity 602. For example, first computing entity 602 may be provided with the HMAC'd value of the matching elements—in such an embodiment, both first computing entity and second computing entity are provided with information that the counterparty lacks: in this case, first computing entity is provided with the matching HMAC's which first computing entity can use to identify the matching members; and second computing entity is provided with the private set intersection sum but not the specific set members that matched. Accordingly, in at least one embodiment, a secure MPC protocol is used to facilitate the exchange of one piece of information for another.

Figure 7:
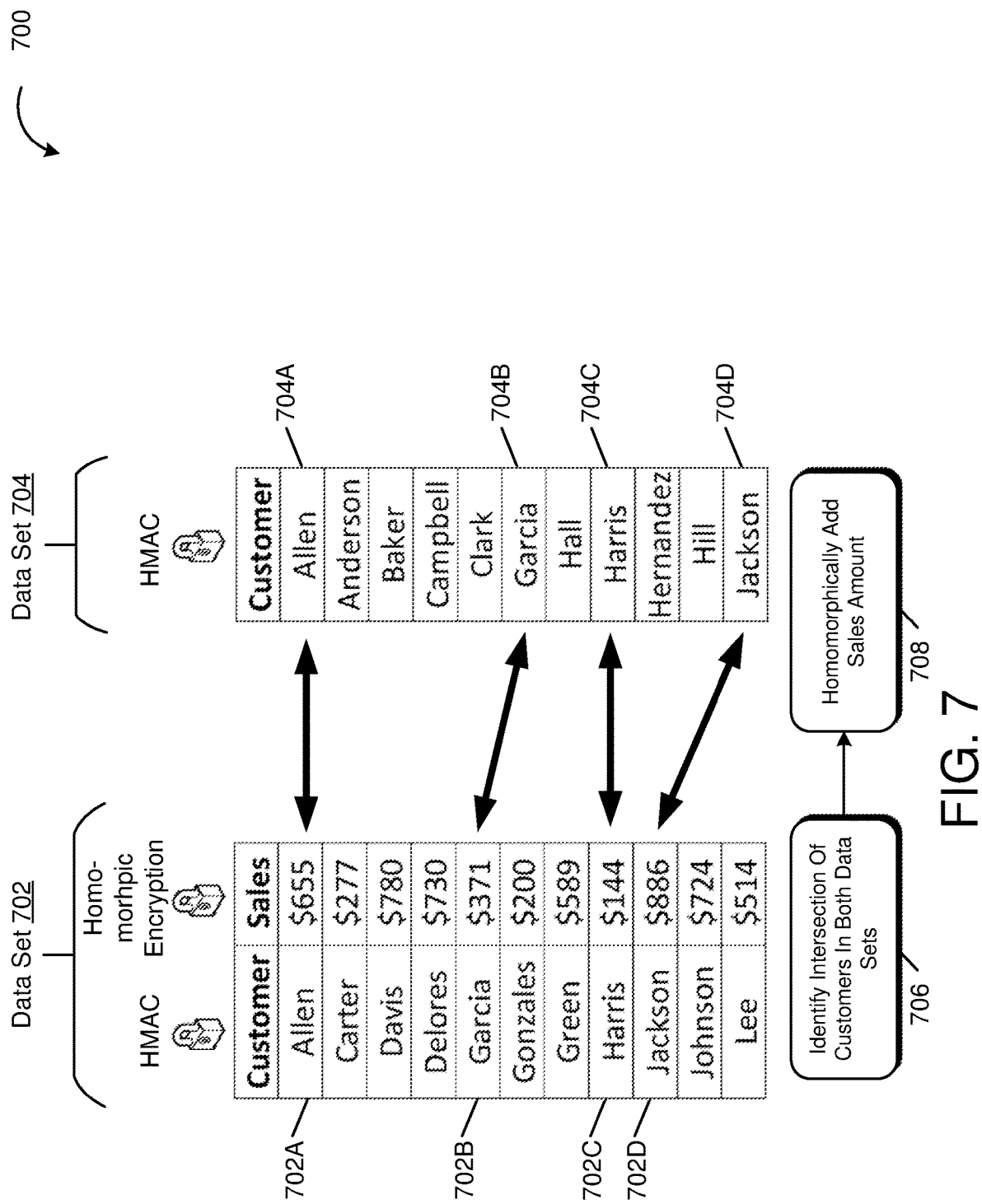
FIG. 7 illustrates a computing environment in which a secure multiparty computation protocol may be implemented, in accordance with one or more example embodiments of the present disclosure.

FIG. 7 illustrates a computing environment 700 in which a secure multiparty computation protocol may be implemented, in accordance with one or more example embodiments of the present disclosure. FIG. 7 may be implemented in the context of various computing environments described herein, including those discussed in connection with FIGS. 1-6.

FIG. 7 depicts an illustrative example of a computation that may be performed using cryptographically protected data set. In FIG. 7, a first data set 702 may be owned/controlled by a first organization and include information relating to customers and sales information. The first organization may consider the sales data to be sensitive/private information that it does not wish to share with others. Likewise, second data set 704 may be owned/controlled by a second organization and include information relating to its customers. First organization may wish to keep its sales data confidential, and second organization may wish to keep its viewership data private.

A secure MPC protocol may be established to compute the efficacy of an ad campaign and whether customers that saw the ad campaign were more likely to make purchases. A secure MPC protocol may be implemented in the following manner, and in accordance with at least one embodiment:

In at least one embodiment, a membership column is identified for both data sets. First and second organizations may agree upon a naming convention for the customer column so that the same customer is encoded in the same way (e.g., by using customer's social security number to uniquely identify the customer). The membership columns may be HMAC'd using a shared secret that is agreed upon by the two parties.

In at least one embodiment, as part of a secure MPC protocol, first data set 702 is cryptographically protected using various techniques (e.g., HMAC, OPE, HE techniques), the rows are shuffled or randomized, and then transmitted to a server. Likewise, second data set 704 is cryptographically protected as depicted in FIG. 7, shuffled, and transmitted to the same server. The server may identify the intersection of customers using private set intersection 706 by comparing the HMAC'd values in both cryptographically protected customer columns to identify matches. An inner join may be performed on the two cryptographically protected data sets to produce an output data set that includes only the rows for which the customer is in both data sets—in FIG. 7, these would include {Allen, Garcia, Harris, and Jackson}.

Next, the server may take the result of the inner join and decrypt and compute a homomorphic sum that represents the sales amount 708 As depicted in FIG. 7, the encrypted sales values of rows 702A-D may be homomorphically added to produce a homomorphically encrypted sum [655]⊕[371]⊕[144]⊕[886] which is equal to [655+371+144+886] . This encrypted sum may be provided to the owner of data set 704, who is then able to decrypt the homomorphically encrypted sum [655+371+144+886=2056] and determine that $2,056 in sales may be attributable to customers that saw the ad campaign. Whether or not the first organization is provided information regarding which customers the ad campaign drove sales for may be prescribed in the secure MPC protocol—for example, the second organization may want such information to be private so that the first organization does not know the viewing habits of its customers. In some embodiments, the first organization may be provided with the cardinality of the set or the average amount of sales per customer that saw the ad, or other metrics that may be useful in determining the efficacy of an ad campaign. Likewise, the secure MPC protocol may prescribe what information—if any—is made available to the second organization.

In some embodiments, an order-preserving encryption scheme (OPE) may be used in place of or in conjunction with a HE scheme to provide additional information. An order-preserving encryption scheme may refer to a type of encryption scheme that deterministically produces ciphertexts that preserve the numeric ordering of the plaintexts. For example, if the integer "918" is encrypted using an OPE scheme, the ciphertext will be greater in value than the ciphertext generated by encrypting a smaller integer "716." OPE may be a cryptographic technique that allows the relative value of data elements within a data set or across data sets to be compared against each other. For example, in FIG. 7, the sales values may be encrypted according to a OPE scheme. The server may use the encrypted quantities to identify the rows of data set 702 with the maximum, minimum, and median sales values without having access to the underlying sales values.

Figure 8:
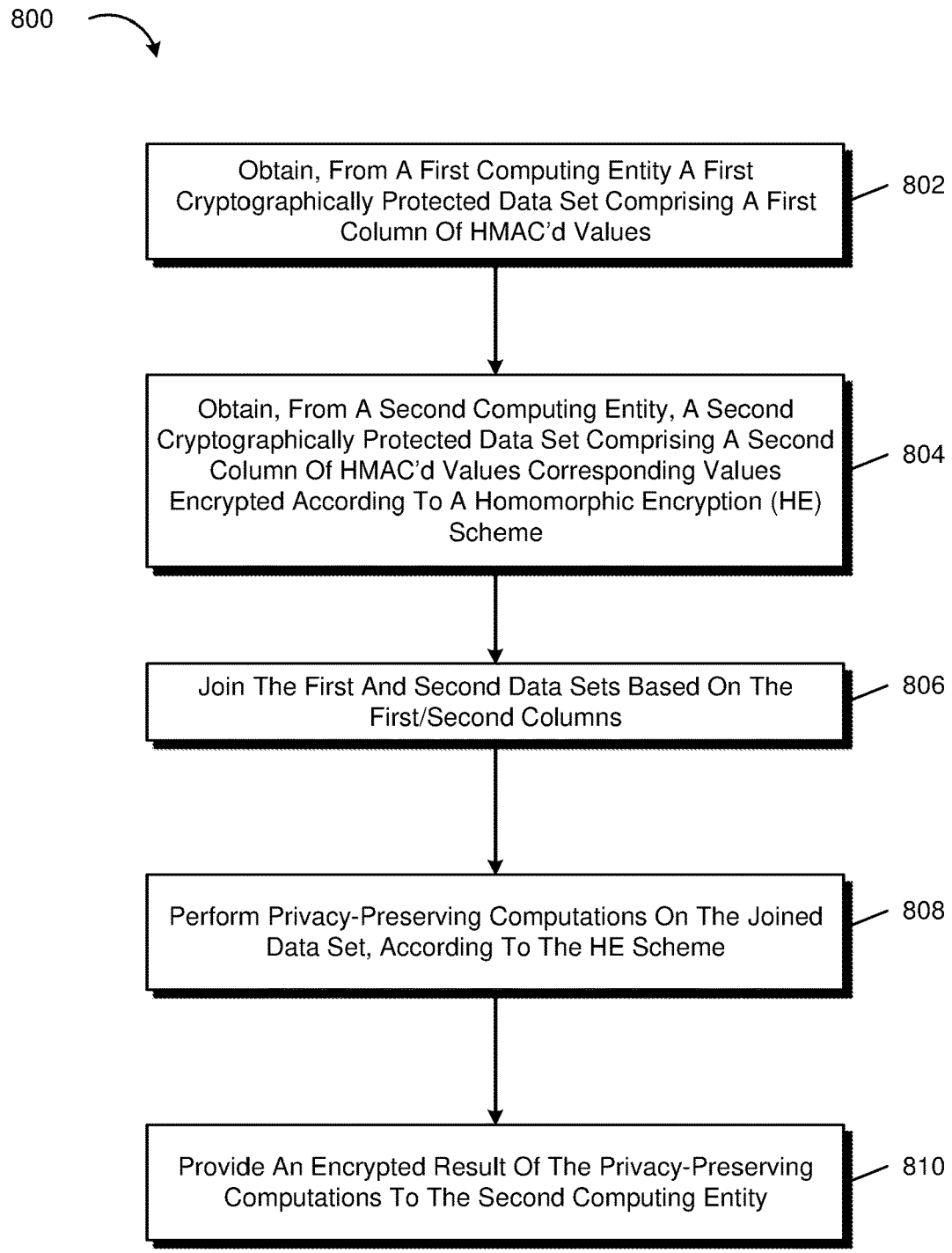
FIG. 8 shows an illustrative example of a process for server-aided secure multiparty computation, in accordance with one or more example embodiments of the present disclosure.

FIG. 8 shows an illustrative example of a process 800 for server-aided multiparty computation, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1, 2, and 9. In at least one embodiment, process 800 or a portion thereof is implemented by a computing resource service provider.

In at least one embodiment, process 800 comprises a step to obtain 802 first cryptographically protected data set comprising a first column of HMAC'd values. The first cryptographically protected data set may be received or otherwise obtained by a server and from a first client computing entity that uses a secret shared with a second computing entity to generate HMAC values. Cryptographically protected data elements may be in accordance with those described throughout this disclosure, including those discussed in connection with FIGS. 1-7. While FIG. 8 describes the use of a HMAC algorithm, other suitable keyed one-way functions such as keyed cryptographic hash functions may be used in place of or in combination with HMACs. First cryptographically protected data set may include other cryptographically protected columns. Cryptographic protection techniques such as keyed one-way functions, order-preserving encryption, and homomorphic encryption may be utilized to cryptographically protect data sets or columns thereof.

In at least one embodiment, process 800 comprises a step to obtain 804 second cryptographically protected data set comprising a second column of HMAC'd values and a third set of values encrypted according to a homomorphic encryption (HE) scheme. Cryptographically protected data may be organized into cryptographically protected tuples of data comprising a set member that is HMAC'd and a corresponding value that is homomorphically encrypted. CKKS HE scheme is an example of a HE scheme. The second cryptographically protected data set may be received or otherwise obtained by a server and from a second client computing entity that uses a secret shared with a first computing entity to generate HMAC values. Cryptographically protected data elements may be in accordance with those described throughout this disclosure, including those discussed in connection with FIGS. 1-7. While FIG. 8 describes the use of a HMAC algorithm, other suitable keyed one-way functions such as keyed cryptographic hash functions may be used in place of or in combination with HMACs.

In at least one embodiment process 800 comprises a set to join 806 the first and second data sets based on the first and second columns. A join may refer to a relational algebra operation for combining columns of two or more data sets or table to produce a joined data set or table. A join may include but is not limited to: inner join, full outer join, full right join, and full left join. In at least one embodiment, the system performing process 800 identifies HMAC'd values that are common to both first column and second column and includes data from those rows in a joined cryptographically protected data set. In some cases, private set intersection is performed on multiple columns—for example, cryptographically protected given name and surname columns may be provided by two computing entities and the cryptographically protected given name and surname may both be required to match in order to count as an intersection.

In at least one embodiment, process 800 comprises a step to perform 808 privacy-preserving computations on the joined data set, according to the HE scheme. In at least one embodiment, such as those described in connection with FIG. 7, cryptographically protected tables are joined and used to compute a sum based on a third column (e.g., sales column). In some embodiments, the privacy-preserving computation includes further logic, such as performing comparisons of cryptographically protected data elements that were encrypted using an order-preserving encryption scheme that keeps the underlying contents confidential but allows the system performing process 800 to determine the relative value of two plaintexts based on their ciphertexts.

In at least one embodiment, process 800 comprises a step to provide 810 an encrypted result of the privacy-preserving computations to the second computing entity. The encrypted result may be generated based on the computation of one or more HE operations to homomorphically add, multiply, etc. ciphertexts. Second computing entity may possess or otherwise have access to a cryptographic key that can be used to decrypt the encrypted result. In this way, the plaintext result is kept secret from the system/server performing the privacy-preserving computations.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 9:
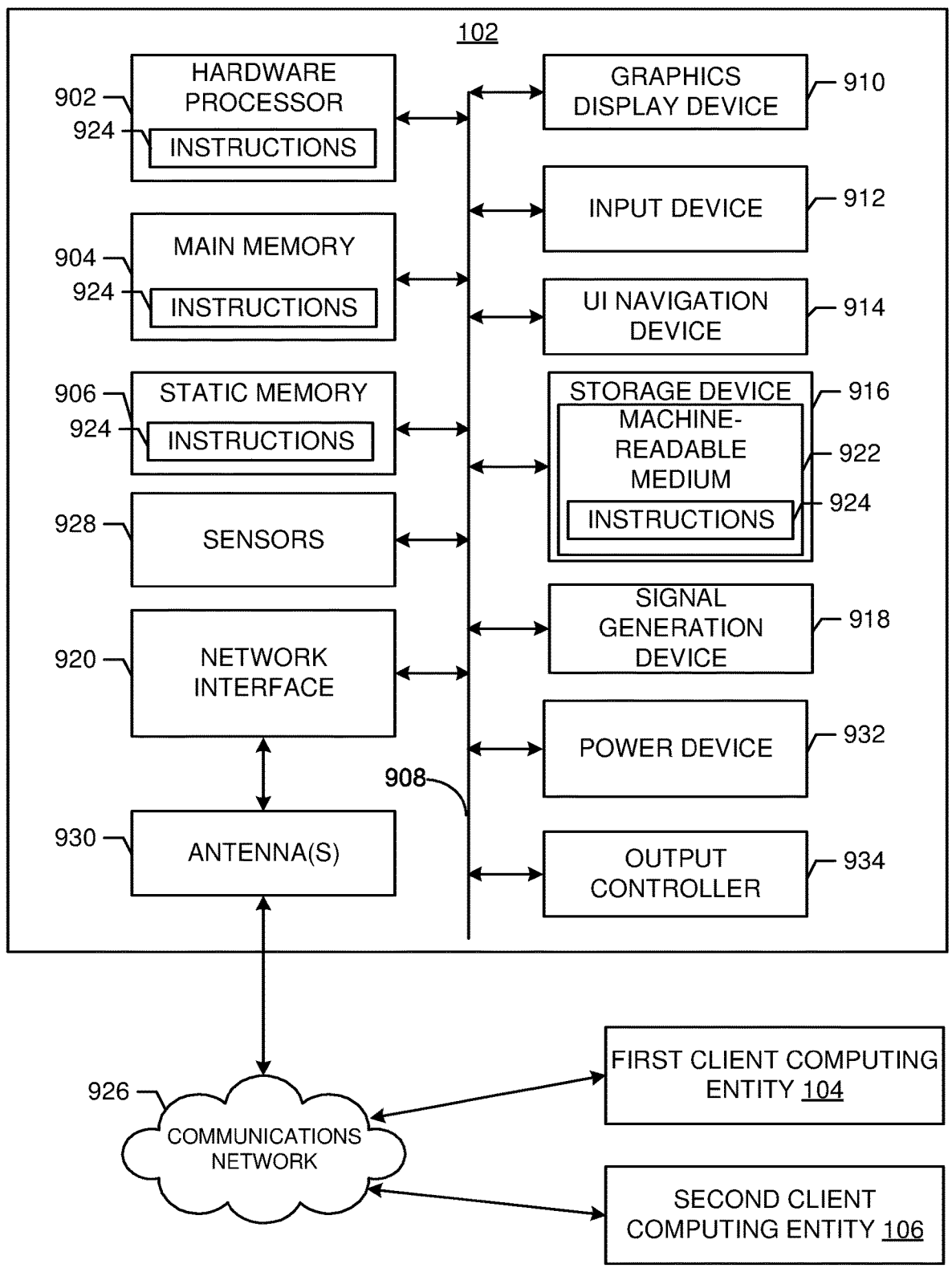
FIG. 9 illustrates a block diagram of an example machine upon which any of one or more techniques (e.g., methods) may be performed, in accordance with one or more example embodiments of the present disclosure.

FIG. 9 illustrates a block diagram of an example of a machine (e.g., server 202). In some embodiments, the machine (e.g., server 202) may operate as a standalone device or may be connected (e.g., networked) to other machines. In a networked deployment, the machine (e.g., server 202) may operate in the capacity of a server machine, a client machine, or both in server-client network environments. In an example, the machine (e.g., server 202) may act as a peer machine in Wi-Fi direct, peer-to-peer (P2P) (or other distributed) network environments. The machine (e.g., server 202) may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations. Server 202 depicted in FIG. 9 may communicate with first client computing entity 204 and second client computing entity 206 via network 926 to perform server-aided secure multiparty computations using cryptographically protected data provided by the clients, for example, according to techniques described in connection with FIGS. 1-8.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include any combination of the illustrated components. For example, the machine (e.g., server 202) may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine (e.g., server 202) may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine (e.g., server 202) may additionally include a storage device (e.g., drive unit) 916, a signal generation device 918, and a network interface device/transceiver 920 coupled to antenna(s) 930. The machine (e.g., server 202) may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine (e.g., server 202). In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine (e.g., server 202) and that cause the machine (e.g., server 202) to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine (e.g., server 202) and includes digital or analog communications signals or other intangible media to facilitate communication of such software.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that f(x)=y is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. Further, unless stated otherwise or otherwise clear from context, the phrase "based on" means "based at least in part on" and not "based solely on."

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

What is claimed is:

1. A system, comprising:
one or more processors; and
memory storing executable instructions that, as a result of execution by the one or more processors, cause the system to:
obtain, from a first computing entity, a first cryptographically protected data set comprising a first column of cryptographically protected data elements generated using a keyed one-way function and based on a first cryptographic secret, wherein the first cryptographic secret is shared between the first computing entity and a second computing entity;
obtain, from the second computing entity, a second cryptographically protected data set comprising:
a second column of cryptographically protected data elements generated using the keyed one-way function and based on the first cryptographic secret; and
a third column of cryptographically protected data elements encrypted according to a homomorphic encryption scheme, wherein plaintext of the third column is inaccessible to the system;
perform a privacy-preserving comparison of the first cryptographically protected data set and the second cryptographically protected data set to identify a joined cryptographically protected data set comprising a subset of the third column;
compute an encrypted result of the subset of the third column according to the homomorphic encryption scheme; and
provide the encrypted result to the second computing entity, wherein the second computing entity has access to a second cryptographic key usable to decrypt the encrypted result.

2. The system of claim 1, wherein the homomorphic encryption scheme is implemented according to an ElGamal crypto system.

3. The system of claim 1, wherein the instructions include further instructions that, as a result of execution by the one or more processors, cause the system to provide, to the first computing entity, cardinality of the subset.

4. The system of claim 1, wherein the instructions to perform the privacy-preserving comparison of the first cryptographically protected data set and the second cryptographically protected data set to identify the subset of the third column include instructions that, as a result of execution by the one or more processors, cause the system to:
compare a first cryptographically protected data element located at a first row of the first column with a second cryptographically protected data element located at a second row of the second column; and
include the second row of the third column in the subset.

5. A computer-implemented method, comprising:
at a third computing entity:
obtaining, from a first computing entity, a first cryptographically protected data set comprising a first set generated based on cryptographic material shared between the first computing entity and a second computing entity;
obtaining, from the second computing entity, a second cryptographically protected data set comprising:
a second set generated based on the cryptographic material; and
a plurality of encrypted data elements generated according to a homomorphic encryption scheme that correspond to the second set;
performing a join, based on the first cryptographically protected data set and the second cryptographically protected data set, to identify a collection of one or more encrypted data elements;
performing, according to the homomorphic encryption scheme, one or more privacy-preserving computations using the collection of one or more encrypted data elements; and
providing an encrypted result of the one or more computations to the second computing entity.

6. The method of claim 5, wherein performing the join, based on the first cryptographically protected data set and the second cryptographically protected data set comprises:

identifying a first cryptographically protected data element located at a first row of the first set;
identifying a second cryptographically protected data element located at a second row of the second set;
determining the first cryptographically protected data element matches the second cryptographically protected data element; and
adding an encrypted data element located at the second row of the plurality of encrypted data elements to the collection.

7. The method of claim 5, wherein the one or more privacy-preserving computations comprise a set of homomorphic computations agreed upon by the first computing entity and the second computing entity.

8. The method of claim 5, wherein the first set is generated further based on a Hash-based Message Authentication Code (HMAC) algorithm.

9. The method of claim 5, wherein the homomorphic encryption scheme comprises a partial homomorphic encryption scheme.

10. The method of claim 5, wherein the join is an inner join of the first data set and the second data set based on an equivalence relationship between the first set and the second set.

11. The method of claim 5, further comprising:
determining a second result based on the collection of one or more encrypted data elements; and
providing the second result to the first computing entity.

12. The method of claim 5, further comprising:
obtaining, from a third computing entity, a third cryptographically protected data set comprising a fourth column generated based on the cryptographic material, wherein the cryptographic material is further shared with the third computing entity; and
performing the join further based on the third cryptographically protected data set.

13. A non-transitory computer-readable storage medium storing executable instructions that, as a result of being executed by one or more processors of a computer system, cause the computer system to at least:
establish a first cryptographic secret with a second computer system;
obtain a first data set comprising a plurality of rows of data elements;
determine a cryptographically protected first data set by at least:
cryptographically protecting a first portion of the first data set using the first cryptographic secret; and
homomorphically encrypting a second portion of the first data set using a second cryptographic secret and according to a homomorphic encryption scheme;
shuffling the plurality of rows;
provide, to a third computer system and according to a multiparty computation (MPC) protocol, the cryptographically protected first data set to cause the third computer system to perform one or more privacy-preserving computations based on the first cryptographically protected data set and a second cryptographically protected data set generated by the second computer system, wherein:
the second cryptographically protected data set is also generated based on the first cryptographic secret; and
the third computer system lacks access to the first cryptographic secret;
obtain an encrypted result of the one or more privacy-preserving computations performed based on the first cryptographically protected data set and the second cryptographically protected data set; and
decrypt the encrypted result to obtain a plaintext result.

14. The non-transitory computer-readable storage medium of claim 13, wherein the instructions to cryptographically protect the at least portion of the first data set using the cryptographic secret comprise instructions that, as a result of execution, cause the computer system to:
determine that the first portion of the data set is used to test set membership, according to the MPC protocol; and
cryptographically protect data elements of the first portion using a keyed one-way function and the cryptographic secret.

15. The non-transitory computer-readable storage medium of claim 13, wherein the instructions, as a result of being executed by the one or more processors of the computer system, further cause the system to:
determine that the second portion of the first data set is used to perform at least one of addition or multiplication according to the MPC protocol; and
based on the determination that the second portion of the first data set is used to perform at least one of addition or multiplication, homomorphically encrypt the second portion of the first data set.

16. The non-transitory computer-readable storage medium of claim 15, wherein the homomorphic encryption scheme implements homomorphic addition but not homomorphic multiplication, or homomorphic multiplication but not homomorphic addition.

17. The non-transitory computer-readable storage medium of claim 13, wherein the instructions, as a result of being executed by the one or more processors of the computer system, further cause the system to:
obtain, from the third computer system, one or more cryptographically protected results;
determine a plaintext data element;
cryptographically protect the plaintext data element using the cryptographic secret to determine a cryptographically protected data element; and
determine the cryptographically protected data element matches a cryptographically protected result of the one or more cryptographically protected results, thereby indicating the plaintext data element is included in both the first data set and a second plaintext data set used to generate the second cryptographically protected data set.

18. The non-transitory computer-readable storage medium of claim 13, wherein:
the second cryptographic secret is shared with the second computer system; and
the encrypted result is to be made available to the second computer system according to the MPC protocol.

19. The non-transitory computer-readable storage medium of claim 18, wherein the second cryptographic secret is a symmetric key and the third computer system lacks access to the second cryptographic secret.

20. The non-transitory computer-readable storage medium of claim 13, wherein the instructions, as a result of being executed by the one or more processors of the computer system, further cause the system to obtain, from the third computer system, a plaintext result of the privacy-preserving computations.

21. The non-transitory computer-readable storage medium of claim 13, wherein the homomorphic encryption scheme implements homomorphic addition using an ElGamal crypto system.

* * * * *